US 6,805,095 B2

(12) United States Patent
Sun et al.

(10) Patent No.: US 6,805,095 B2
(45) Date of Patent: Oct. 19, 2004

(54) SYSTEM AND METHOD FOR ESTIMATING AND CONTROLLING CYLINDER AIR CHARGE IN A DIRECT INJECTION INTERNAL COMBUSTION ENGINE

(75) Inventors: Jing Sun, Bloomfield, MI (US); Ilya V. Kolmanovsky, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 10/287,982

(22) Filed: Nov. 5, 2002

(65) Prior Publication Data

US 2004/0084015 A1 May 6, 2004

(51) Int. Cl.[7] .................................................. F02D 9/00
(52) U.S. Cl. .................................. 123/399; 123/568.21
(58) Field of Search .......................... 123/399, 568.21, 123/568.22; 73/118.2; 701/103, 115

(56) References Cited

U.S. PATENT DOCUMENTS

| | | | | |
|---|---|---|---|---|
| 5,654,501 A | * | 8/1997 | Grizzle et al. ............. | 73/118.2 |
| 5,738,126 A | * | 4/1998 | Fausten .................. | 123/568.21 |
| 6,035,639 A | * | 3/2000 | Kolmanovsky et al. .... | 60/605.2 |
| 6,109,249 A | * | 8/2000 | Wild et al. ............. | 123/568.21 |
| 6,170,475 B1 | * | 1/2001 | Lewis et al. ............ | 123/568.21 |
| 6,199,537 B1 | * | 3/2001 | Kowatari et al. ........... | 123/399 |
| 6,219,611 B1 | | 4/2001 | Russell ........................ | 701/105 |
| 6,293,267 B1 | * | 9/2001 | Smith et al. ........... | 123/568.22 |
| 6,298,835 B1 | | 10/2001 | Horie et al. ........... | 123/568.21 |
| 6,311,679 B1 | | 11/2001 | Druzhinina et al. ... | 123/568.21 |
| 6,321,732 B1 | * | 11/2001 | Kotwicki et al. ...... | 123/568.16 |
| 6,363,316 B1 | | 3/2002 | Soliman et al. | |
| 6,367,462 B1 | | 4/2002 | McKay et al. ......... | 123/568.21 |
| 6,460,409 B1 | | 10/2002 | Soliman et al. | |
| 6,651,492 B2 | * | 11/2003 | Kolmanovsky et al. .... | 73/118.2 |
| 6,672,060 B1 | * | 1/2004 | Buckland et al. ............. | 60/602 |
| 2002/0046742 A1 | * | 4/2002 | Hagari .................. | 123/568.22 |

FOREIGN PATENT DOCUMENTS

| | | | |
|---|---|---|---|
| GB | 2 362 226 A | 11/2001 | |
| JP | 90449 | * 4/1988 | ........... F02D/41/14 |

OTHER PUBLICATIONS

"Adaptive Identification Schemes in Presence of Bounded Disturbances: An Automotive Case Study," by I. Kolmanovsky and I. Siverguina, {Proceedings of 2001 IEEE Conference on Decision and Control}, Orlando, Florida, Dec., 2001.

P. Andersson et al., "Modeling and Architecture Examples of Model Based Engine Control", Linkoping University, Sweden, 9 pages.

* cited by examiner

Primary Examiner—Hai Huynh

(57) ABSTRACT

A method for controlling cylinder charge in a direct-injection, spark-ignition engine. The engine includes an intake manifold and an electronically controlled throttle (ETC) valve controlling air flow from the atmosphere to the intake manifold of said engine. The method includes: measuring an intake manifold pressure value, $P_i$; measuring a flow value, $W_{thr,m}$, which is indicative of flow through the ETC throttle; determining a desired intake manifold pressure value, $P_{i\_d}$; determining a desired ETC valve position, $u_{thr,d}$; determining a desired flow, $W_{thr\_d}$, through the ETC valve; and, adjusting said ETC valve position, $u_{thr}$, in accordance with: said desired ETC valve position, $u_{thr,d}$; a difference between the measured intake manifold pressure value, $P_i$, and the determined desired intake manifold pressure value, $P_{i\_d}$; and a difference between the measured flow value, $W_{thr,m}$, through the ETC valve and the determined desired flow, $W_{thr\_d}$. In-cylinder and throttle body adaptation is also provided.

10 Claims, 13 Drawing Sheets

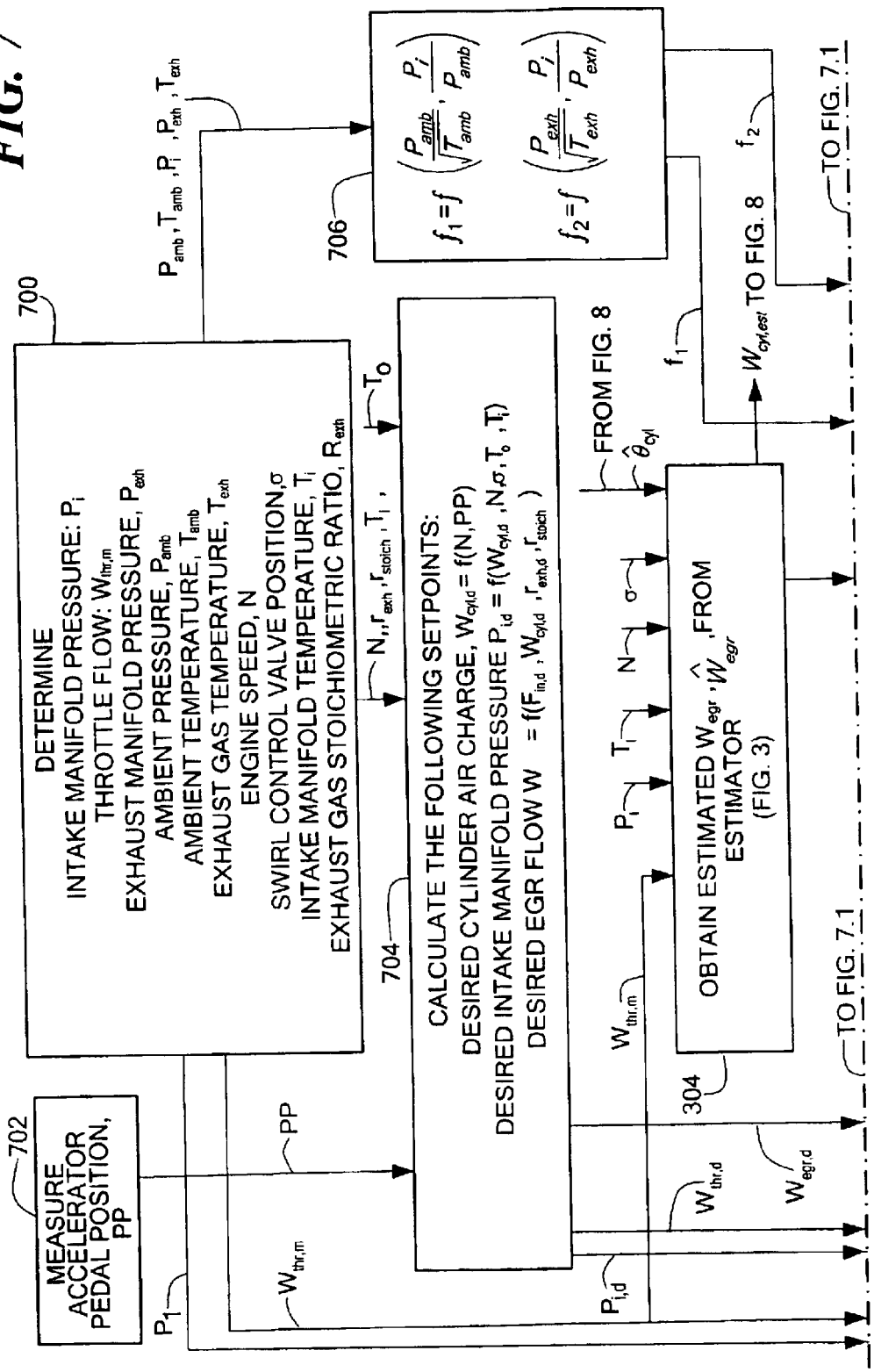

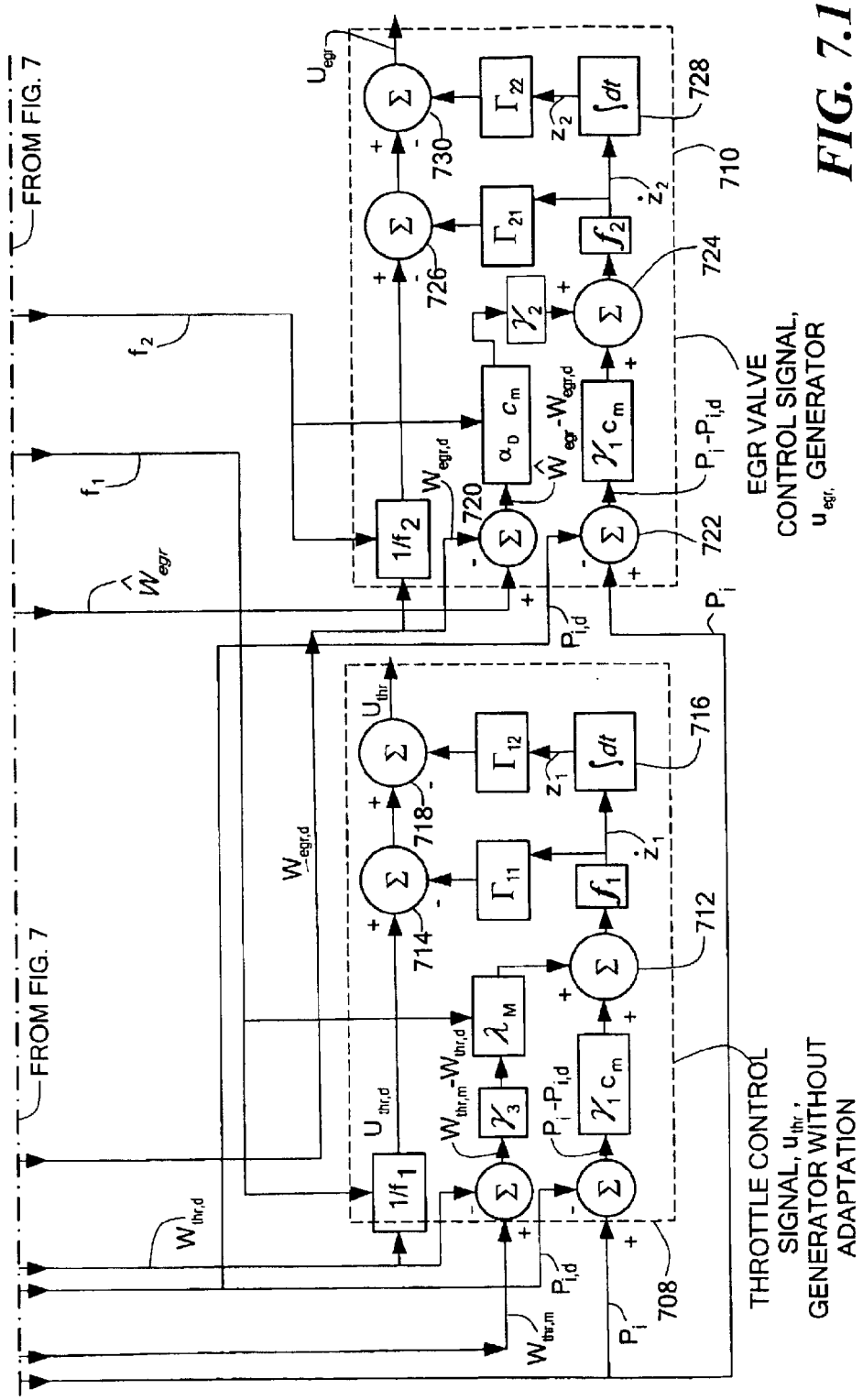
FIG. 7.1

SYSTEM AND METHOD FOR ESTIMATING AND CONTROLLING CYLINDER AIR CHARGE IN A DIRECT INJECTION INTERNAL COMBUSTION ENGINE

TECHNICAL FIELD

This invention relates to internal combustion engines, and more particularly to systems and methods for controlling and estimating cylinder air charge in direct injection internal combustion engines.

BACKGROUND

As is known in the art, cylinder air charge estimation and control are important in meeting performance requirements of advanced technology engines, such as direct injection spark ignition (DISI) engines. The objective of the air-charge control in lean-burn, spark-ignited engines is to operate an electronic throttle and the exhaust gas recirculation (EGR) valve in a manner so as to provide the desired gas flow to the engine and the desired burnt gas fraction in this flow for $NO_x$ reduction. A secondary objective of air-charge control is to provide updated estimates of the in-cylinder conditions, in terms of charge quantity and burnt gas fraction, as inputs to other Engine Management System (EMS) features, such as torque and fueling control. This function is referred to as charge estimation. The conventional approach to the cylinder air-charge control is open-loop whereby the desired mass flow rates through the EGR valve and throttle are calculated as functions of the desired burnt gas fraction in the intake manifold and of the desired gas flow into the cylinder using the orifice equation.

On a typical DISI engine, an electronic throttle (ETC) is used to control the inlet fresh air while the burnt gas is recirculated from the exhaust manifold back into the intake manifold through an exhaust gas recirculation (EGR) valve. Another valve, referred to as the swirl control valve (SCV), or other charge motion device, such as cam profile switching (CPS), is also present in the intake system to effect different swirl ratios and therefore to provide the mixture motion in the cylinder that optimizes the combustion process, especially in the stratified operation.

Difficulties in developing a simple and robust cylinder air charge controller for a DISI engine result from several special characteristics associated with the lean burn and stratified operation. First, when the engine operates lean, the flow through the EGR valve contains unburnt air that has not been consumed in the previous combustion event, and this, together with the intake manifold dynamics, adds difficulties in accurately estimating the in-cylinder burnt gas fraction. Second, accurate air flow estimates via the orifice equation are hard to obtain at high manifold pressures where a DISI engine may frequently operate. Third, the buildup of soot and other deposits in the EGR conduit and intake ports is more severe on DISI engines because of the stratified operation and high flow volume of EGR. The deposits change the valve flow and engine breathing characteristics and make the charge control system very susceptible to aging. Other factors, such as actuator imperfection due to friction and quantization, also contribute to complicating the problem.

As is known in the art, open-loop charge estimation and control have been used for a conventional PFI engine. For an open-loop charge estimation for a DISI engine, the estimates of flows through the throttle and the EGR valve are based on the orifice equation, the flow into the cylinders based on the speed-density equation, and the burnt gas fraction in the intake manifold based on the manifold dynamic model and mass balance of air and burnt gas. More particularly, the standard orifice equation applied to the throttle and EGR valve gives the following estimates for $W_{thr}$ (i.e., the fresh air flowing through the throttle) and $W_{egr}$ (i.e., the recirculated gas flowing through the EGR valve):

$$W_{thr} = f\left(\frac{P_{amb}}{\sqrt{T_{amb}}}, \frac{P_i}{P_{amb}}\right) u_{thr}(\theta_{thr}) \qquad (1)$$

$$W_{egr} = f\left(\frac{P_{exh}}{\sqrt{T_{exh}}}, \frac{P_i}{P_{exh}}\right) u_{egr}(\theta_{egr}) \qquad (2)$$

where f is a function (fcn) of upstream pressure, upstream temperature, and the pressure ratio across the throttle and EGR valve given by:

$$f(x,y) = \gamma^{\frac{1}{2}}\left(\frac{2}{\gamma+1}\right) x \quad \text{if } y \le 0.528$$

$$f(x,y) = xy^{\frac{1}{\gamma}}\left\{\frac{2\gamma}{\gamma+1}\left[1 - y^{\frac{\gamma-1}{\gamma}}\right]\right\} \quad \text{if } y > 0.528$$

and $\gamma$ is the ratio of specific heats ($\gamma=1.4$), $P_i$, $P_{exh}$, $P_{amb}$ are the pressures in the intake manifold, exhaust manifold and at ambient conditions, respectively, $T_{amb}$, $T_{exh}$ are the temperatures at ambient conditions and in the exhaust gas, respectively. The parameters $u_{thr}$ and $u_{egr}$ are effective flow areas for the throttle and EGR valve, respectively, as functions of the direct control commands: throttle angle $\theta_{thr}$ (0 degrees–90 degrees) and the percentage of opening of the EGR valve $d_{egr}$ (0–100%). These two functions depend on the geometric configuration of the throttle and EGR valves, respectively, and are identified from the experimental data. In calibrating these two functions, numerical values of $u_{thr}$ and $u_{egr}$ are first calculated from the engine mapping data using equations (1) and (2) for different throttle and EGR valve openings. Then standard regression techniques are applied to correlate $u_{thr}$ with $\theta_{thr}$, $u_{egr}$ with $d_{egr}$, respectively.

The standard, open-loop scheme of controlling the cylinder air charge and the burnt gas fraction in the intake system consists of three steps:

1. Given the desired exhaust air-to-fuel ratio $r_{exh,d}$, the desired in-cylinder flow $W_{cyl,d}$ and the desired intake manifold burnt gas fraction $F_{in,d}$, backtrack the desired EGR flow $W_{egr,d}$ and throttle flow $W_{thr,d}$:

$$W_{egr,d} = \frac{F_{in,d} W_{cyl,d}(1 + r_{exh,d})}{1 + r_{stoich}} \qquad (3)$$

$$W_{thr,d} = W_{cyl,d} - W_{egr,d} \qquad (4)$$

2. Determine the desired intake manifold pressure $P_{i,d}$ from the speed density equation (7) below for the given $W_{cyl,d}$, $\sigma$ and N, where the setting $\sigma$ for the swirl control valve is usually determined from a pre-stored lookup table.

3. Invert the orifice flow representations and the effective flow area functions to determine the desired commands for the throttle and EGR valve effective flow areas $$u_{thr,d} = \frac{W_{thr,d}}{f\left(\frac{P_{amb}}{\sqrt{T_{amb}}}, \frac{P_{i,d}}{P_{amb}}\right)} \qquad (5)$$

-continued $$u_{egr,d} = \frac{W_{egr,d}}{f\left(\frac{P_{exh}}{\sqrt{T_{exh}}}, \frac{P_{i,d}}{P_{exh}}\right)} \quad (6)$$

Then invert the throttle and EGR valve effective flow area functions to determine the desired commands for throttle and EGR valve positions $\theta_{thr}$, $d_{egr}$.

The open-loop charge estimation and control approach described above has the advantages of being simple, intuitive and well understood. Its fundamental drawback, however, is the lack of robustness. In particular, this open-loop scheme does not address the following issues that are especially important for DISI engine operation: Limitations and sensitivities of the orifice equation under the high intake manifold pressure conditions (pressure drop close to 1); Lack of on-board measurements for exhaust manifold pressure and temperature; and, Soot deposit buildup and its effects on the engine behavior. Another difficulty in using the orifice equation for flow estimation is its reliance on the knowledge of upstream pressure and temperature. Especially for the EGR valve, the upstream (i.e., exhaust) temperature and pressure vary in a wide range, and no on-board measurement is available for these variables on most production vehicles. Any error in the estimated exhaust temperature and pressure will further deteriorate the quality of flow estimation.

The soot deposit buildup in the intake system or in the EGR conduit is another major problem for a stratified DISI engine. It is largely due to the stratified combustion and high volume of EGR flow. It is very difficult, if not impossible, to predict the effects of the deposits on the effective flow area over time.

SUMMARY

In accordance with the present invention, a method is provided for controlling cylinder charge in a direct-injection, spark-ignition engine. The engine includes an intake manifold and an electronically controlled throttle (ETC) valve controlling air flow from the atmosphere to the intake manifold of said engine. The method includes: measuring an intake manifold pressure value, $P_i$; measuring a flow value, $W_{thr,m}$, which is indicative of flow through the ETC throttle; determining a desired intake manifold pressure value, $P_{i\ d}$; determining a desired ETC valve position, $u_{thr,d}$; determining a desired flow, $W_{thr,d}$, through the ETC valve; and, adjusting said ETC valve position, $u_{thr}$, in accordance with: said desired ETC valve position, $u_{thr,d}$; a difference between the measured intake manifold pressure value, $P_i$, and the determined desired intake manifold pressure value, $P_{i\ d}$; and a difference between the measured flow value, $W_{thr,m}$, through the ETC valve and the determined desired flow, $W_{thr,d}$.

In accordance with another feature of the invention, a method is provided for controlling cylinder charge in a direct-injection, spark-ignition engine. The engine includes an intake manifold and an electronically controlled throttle (ETC) valve for controlling air flow from the atmosphere to the intake manifold of said engine. The method includes: parameterizing air flow through the ETC valve as:

$$W_{thr} = \beta_{thr}^0 + \beta_{thr}^1 \overline{W}_{thr}$$

where: $\beta_{thr}^0$ and $\beta_{thr}^1$ are estimator parameters; $\overline{W}_{thr}$ is a nominal predicted flow through the ETC valve, such predicted flow being a function of measured ETC valve position and measured intake manifold pressure. Differences between the measured flow through the ETC valve and the predicted flow through the ETC valve are determined. The estimator parameters are modified in accordance with the determined differences. A desired air flow through the ETC valve is provided by adjusting the ETC valve position, $u_{thr}$, in accordance with the parameterized air flow, such parameterized air flow being a function of the estimator parameters.

In one embodiment, the nominal predicted flow is determined from the standard orifice flow equation.

In one embodiment, the estimator parameters are modified in accordance with:

$$\hat{\beta}_{thr}^0(t+T_a) = \hat{\beta}_{thr}^0(t) + \gamma_{thr}^0 \varepsilon_{thr} \frac{1}{1+\overline{W}_{thr}^2}$$

$$\hat{\beta}_{thr}^1(t+T_a) = \hat{\beta}_{thr}^1(t) + \gamma_{thr}^1 \varepsilon_{thr} \frac{\overline{W}_{thr}}{1+\overline{W}_{thr}^2}$$

where:

$\varepsilon_{thr} = W_{thr,m} - \hat{W}_{thr}$; $\hat{W}_{thr} = \hat{\beta}_{thr}^0 + \hat{\beta}_{thr}^1 \overline{W}_{thr}$ and $\gamma_{thr}^0$, $\gamma_{thr}^1$, are adaptation gains, $t+T_a$ is a time such adaptation parameters are updated, and $W_{thr,m}$ is measured flow through the ETC valve.

In one embodiment, the adaptation is disabled when the intake manifold pressure is relatively high and the ETC valve is experiencing a relatively large transient condition.

In one embodiment, the modifying comprises estimating flow through the ETC valve.

In one embodiment, the estimating includes using an adaptation algorithm.

In accordance with another feature of the invention, a method is provided for controlling air charge in a direct-injection, spark-ignition engine. The engine includes an exhaust gas recirculation (EGR) valve connecting the exhaust manifold and intake manifold of the engine and an electronically controlled throttle (ETC) valve controlling air flow from the atmosphere to the intake manifold of said engine. The method includes providing an estimator for estimating flow through the EGR valve. During a calibration mode the method: (a) applies a step function to the estimator, such estimator having a dynamic response characteristic to the applied step function, such dynamic response characteristic being a function of a parameter in such estimator; (b) compares the dynamic response characteristic of the estimator to the step function to the dynamic response characteristic provided in accordance with the orifice equation applied to the intake throttle and the EGR valve; and (c) adjusts the parameter of the estimator to a value where the dynamic response characteristic provided by the estimator is substantially match to a predetermined dynamic response. During a subsequent normal operating mode, the step function is removed and the estimator uses the provided desired value to estimate flow through the EGR valve.

In accordance with another feature of the invention, a method is provided for controlling air charge in a direct-injection, spark-ignition engine. The engine includes an exhaust gas recirculation (EGR) valve connecting the exhaust manifold and intake manifold of the engine and an electronically controlled throttle (ETC) valve controlling air flow from the atmosphere to the intake manifold of said engine. The method includes: (A) measuring an intake manifold pressure value; (B) estimating flow into the cylinder as a function of the measured intake manifold pressure; (C) modifying the estimated flow into the cylinder with a time varying multiplier; (D) determining, when the EGR valve is opened, the time varying multiplier as a function of the difference between measured flow through the ETC and the modified estimated flow into the cylinder with a previously determined multiplier.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 7 is a block/flow diagram useful in understanding operation of an intake manifold throttle valve and EGR valve control system for the engine of FIG. 1 according to the invention;

Like reference symbols in the various drawings indicate like elements.

DETAILED DESCRIPTION

Figure 1:
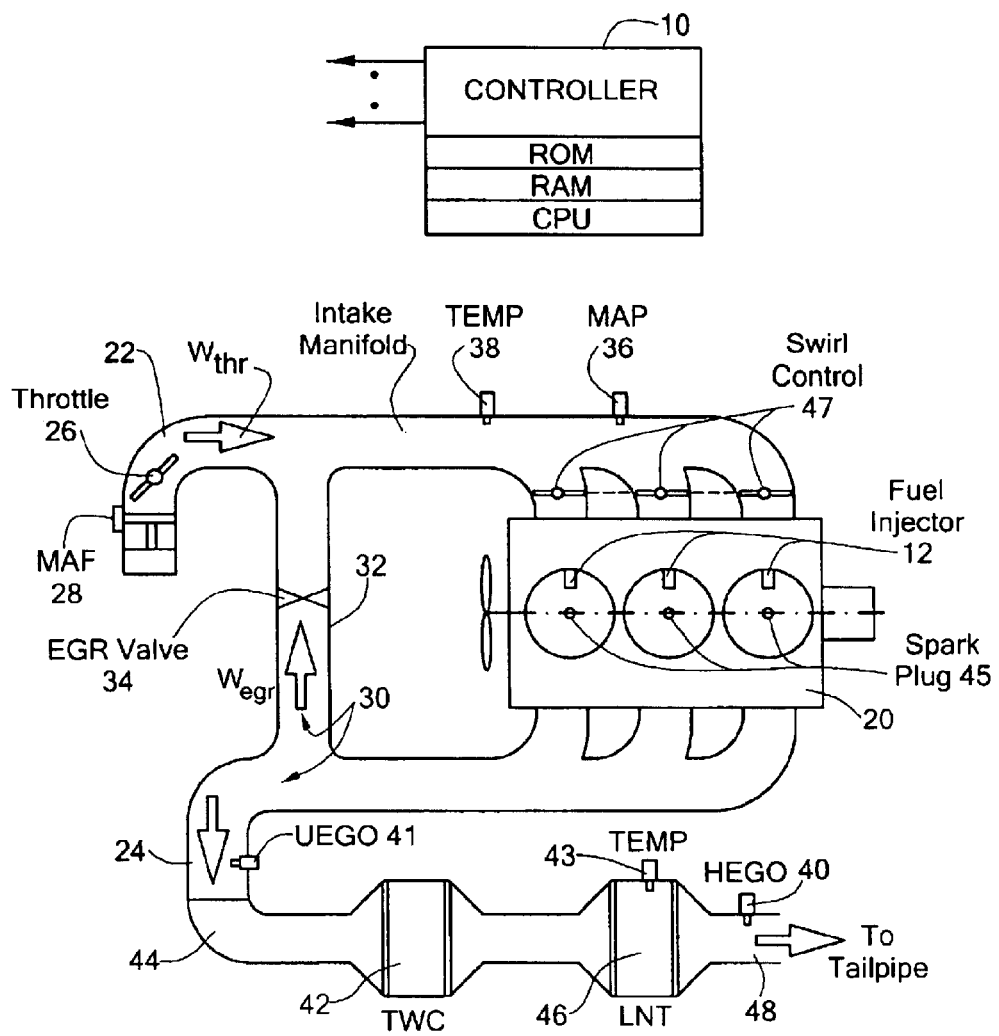
FIG. 1 is a schematic diagram of an engine system according to the invention.

Referring now to FIG. 1, a block diagram of the control system of the present invention is shown. The system comprises an electronic engine controller generally designated 10, that includes ROM, RAM and CPU as indicated. The controller 10 controls a set of injectors 12 which inject fuel into a, here for illustration, three-cylinder, spark ignited, lean-burn gasoline engine 20, it being understood that typically the engine would have additional cylinders. The fuel is supplied by a high pressure fuel system (not shown), and is injected directly into the combustion chambers in precise quantities and timing as determined by the controller 10. Air enters the combustion chambers through the intake manifold 22, and combustion gases are exhausted through the exhaust manifold 24. An electronically controlled throttle valve 26 is positioned by the controller 10 to control the air mass flow (MAF) into the intake manifold 22. An airmeter or air mass flow sensor (MAF) 28 is positioned upstream of the valve 26 and provides a signal to the controller 10 that calculates a value indicative of the mass of air flowing into the induction system. The controller 10 transmits a fuel injector signal to the injectors 12 to produce a desired engine torque and maintain a desired air/fuel ratio.

To reduce the level of $NO_x$ emissions, the engine 20 is equipped with an exhaust gas recirculation (EGR) system 30. The EGR system 30 comprises a conduit 32 connecting the exhaust manifold 24 to the intake manifold 22. This allows a portion of the exhaust gases to be circulated from the exhaust manifold 24 to the intake manifold 22 in the direction of the arrow. An EGR valve 34, controlled by the controller 10, regulates the amount of exhaust gas recirculated from the exhaust manifold. In the combustion chambers, the recirculated exhaust gas acts as an inert gas, thus lowering the flame and in-cylinder gas temperature and decreasing the formation of $NO_x$. On the other hand, the recirculated exhaust gas displaces fresh air and reduces the air-to-fuel ratio of the in-cylinder mixture.

In the controller 10, command signals to the actuators for positioning the EGR valve 34 and the throttle valve 26 are calculated from measured variables and engine operating parameters by means of control algorithms. Sensors and calibratable lookup tables provide the controller 10 with engine operating information. For example, MAP sensor 36 provides a signal to the controller 10 indicative of the pressure in the intake manifold 24. An intake manifold temperature sensor 38 provides a signal to the controller 10 indicative of the temperature of the gas in the intake manifold. The sensors 36 and 38 may be combined if desired. Additional sensory inputs can also be received by the controller 10 such as engine coolant temperature, engine speed, throttle position, and ambient temperature and barometric pressure. Based on the sensory inputs and engine mapping data stored in memory, the controller controls the EGR and throttle valves to regulate the intake airflow. The engine includes spark plugs 45 and swirl valves (SCV) 47, or other charge motion device, such as cam profile switching (CPS), is also present in the intake system to effect different swirl ratios and therefore to provide the mixture motion in the cylinder that optimizes the combustion process, especially in the stratified operation.

A heated exhaust gas oxygen (HEGO) sensor 40 or universal exhaust gas oxygen (UEGO) sensor 41 detects the oxygen content of the exhaust gas generated by the engine, and transmits a signal to the controller 10. Sensor 40 is used for control of the engine A/F, especially during any stoichiometric operation. An exhaust system, comprising one or more exhaust pipes, transports exhaust gas produced from combustion of an air/fuel mixture in the engine to a conventional close-coupled, three-way catalytic converter (TWC) 42. The converter 42 contains a catalyst material that chemically alters exhaust gas that is produced by the engine to generate a catalyzed exhaust gas. The catalyzed exhaust gas is fed through an exhaust pipe 44 to a downstream $NO_x$ trap 46 and thence to the atmosphere through a tailpipe 48. A sensor 43 is provided to measure exhaust gas temperature.

As is usually done, the control and adaptation algorithms discussed hereinafter are specified in continuous time. It is understood, however, that for the actual implementation the algorithms are discretized assuming either a time-synchronous or a crank-synchronous sampling procedure, with compensation of the delay introduced by sampling (if necessary). The signals used by the algorithms are filtered versions of the measured signals. The filters remove the periodic oscillations and noise in the signals so that the mean values of the signals are available for control and adaptation. First or second order linear filters or crank-synchronous sampling are standard ways of deriving the mean value from a signal. Hereinafter, all the signals are identified and referenced as their mean values. The controllers that use the integral action, such as proportional-plus-integral (PI)

controllers, use antiwindup compensation. It is introduced to handle control signal saturation due to actuator limits.

While the use of feedback can compensate for uncertainties and improve system robustness, some variations can be better dealt with by the use of adaptation. The in-cylinder flow and the throttle flow estimates are two good examples where the use of adaptation is both desirable and tractable. Unlike the EGR flow estimate, satisfactory estimates for $W_{cyl}$ and $W_{thr}$ can be obtained by careful calibration when the engine characteristics are given and fixed. The variations that cause inaccuracies in $W_{thr}$ and $W_{cyl}$ estimates, such as soot deposits and component aging, are usually manifested slowly and gradually over time. Adaptive techniques are very effective in compensating such slow varying uncertainties without having to compromise feedfoward and feedback control authority. In fact, the adaptation of the feedforward map that is used to backtrack the desired throttle position from the desired throttle flow rate (see equation (5)) can improve the transient response of the overall system. While feedback with an integral action can also compensate for the mismatch in the feedforward map, such a correction, embedded in the value of the integral state, is not "remembered'" and is thus much less effective in transients. An adaptation scheme does not suffer from the same drawback provided a good parametrization is picked where the uncertainties are fully restricted to unknown parameters.

In-Cylinder Air Flow Estimation

Figure 2:
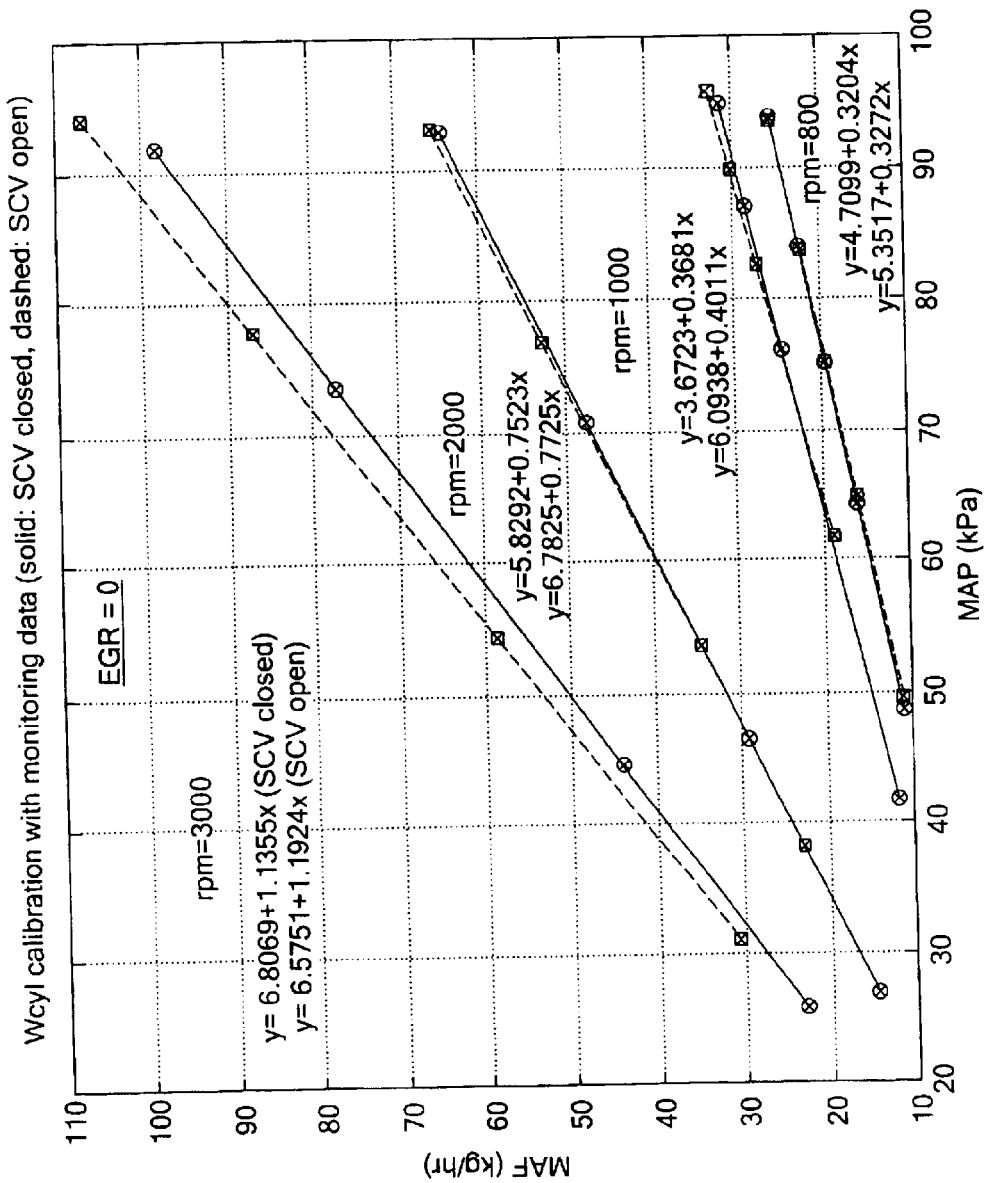
FIG. 2 is a map of the relationship between an cylinder charge flow of the engine of FIG. 1 and the intake manifold pressure of such engine for a variety of engine operating conditions.

The speed-density equation, similar to that used to estimate the in-cylinder flow for port fuel injection (PFI) engines, is applied to a DISI engine. Specifically, the cylinder flow $W_{cyl}$ is estimated according to:

$$W_{cyl} = \frac{T_0}{T_i}(W_{offset}^{T_0}(N, \sigma) + W_{scale}^{T_0}(N, \sigma)P_i) \quad (7)$$

where $T_i$ is the intake manifold temperature (K) and $\sigma$ is the swirl control valve position (in percentage of opening 0–100%). The factor $(W_{offset}^{T_0}+W_{scale}^{T_0}P_i)$ represents the in-cylinder flow under the nominal intake condition at temperature $T_0$. Here, the motoring data ($T_0$=293.15K=20 degC.) for different engine speeds at different intake manifold pressure and swirl control valve settings are regressed to obtain the functions for $W_{offset}^{T_0}$ and $W_{scale}^{T_0}$. The results are shown in FIG. 2, which plots $W_{cyl}$ as a function of $P_i$ with the EGR valve closed. It is noted that the relationship is substantially linear, for any given engine speed, swirl valve position. It is further noted that the slope of each linear curve at is $W_{scale}^{T_0}$ and the value of $W_{cyl}$ at $P_i=0$ is $W_{offset}^{T_0}$. Comparing to the breathing characteristics of a conventional PFI engine, the only difference is in the effects of the swirl control valve position. It can be seen from FIG. 2 that the effects of the SCV are not significant until the engine speed, N, reaches high speeds ($\geq$3000 rpm).

The burnt gas fraction in the intake can be estimated by tracking the in-flowing and out-flowing burnt gas for the intake manifold and utilizing an isothermal intake manifold filling model:

$$F_{in} = \frac{P_{bg}}{P_{in}}$$

$$\dot{P}_{bg} = K_i T_i (W_{egr} F_{exh} - W_{cyl} F_{in})$$

where $P_{bg}$ is the partial pressure of the burnt gas in the intake manifold, $K_1$=R/$V_{intake}$ with R=283 is the gas constant and $V_{intake}$, the intake manifold volume. $F_{exh}$ is the burnt gas fraction in the exhaust which can be calculated from the exhaust air-to-fuel ratio $r_{exh}$ as $$F_{egr} = \frac{1 + r_{stoich}}{1 + r_{exh}}$$

where $r_{stoich}$=14.64 is the stoichiometric air-to-fuel ratio value.

Closed-Loop Observer for EGR Flow

Among the problems mentioned in the above, using orifice equation to predict the flow through the EGR valve represents a very difficult one to overcome. There is no single function of the $u_{egr}$ that can be used to fit the data even when the exhaust pressure and temperature are both measured because the dispersion in data becomes more widespread at high intake manifold pressure and as the EGR valve opens up wider. This is because the EGR valve is exposed to a more dynamic environment where the engine event induced pulsation violates the "steady adiabatic reversible flow" assumption for the orifice equation. To mitigate the limitations of the open-loop EGR flow estimation discussed above, a closed-loop observer scheme is described that is aimed at enhancing the robustness. It uses the time rate of change of the intake manifold pressure, together with the measured throttle flow and estimated in-cylinder flow, to infer the flow through the EGR valve, thereby eliminating the dependency on the orifice equation and exhaust pressure and temperature measurements.

Figure 3:
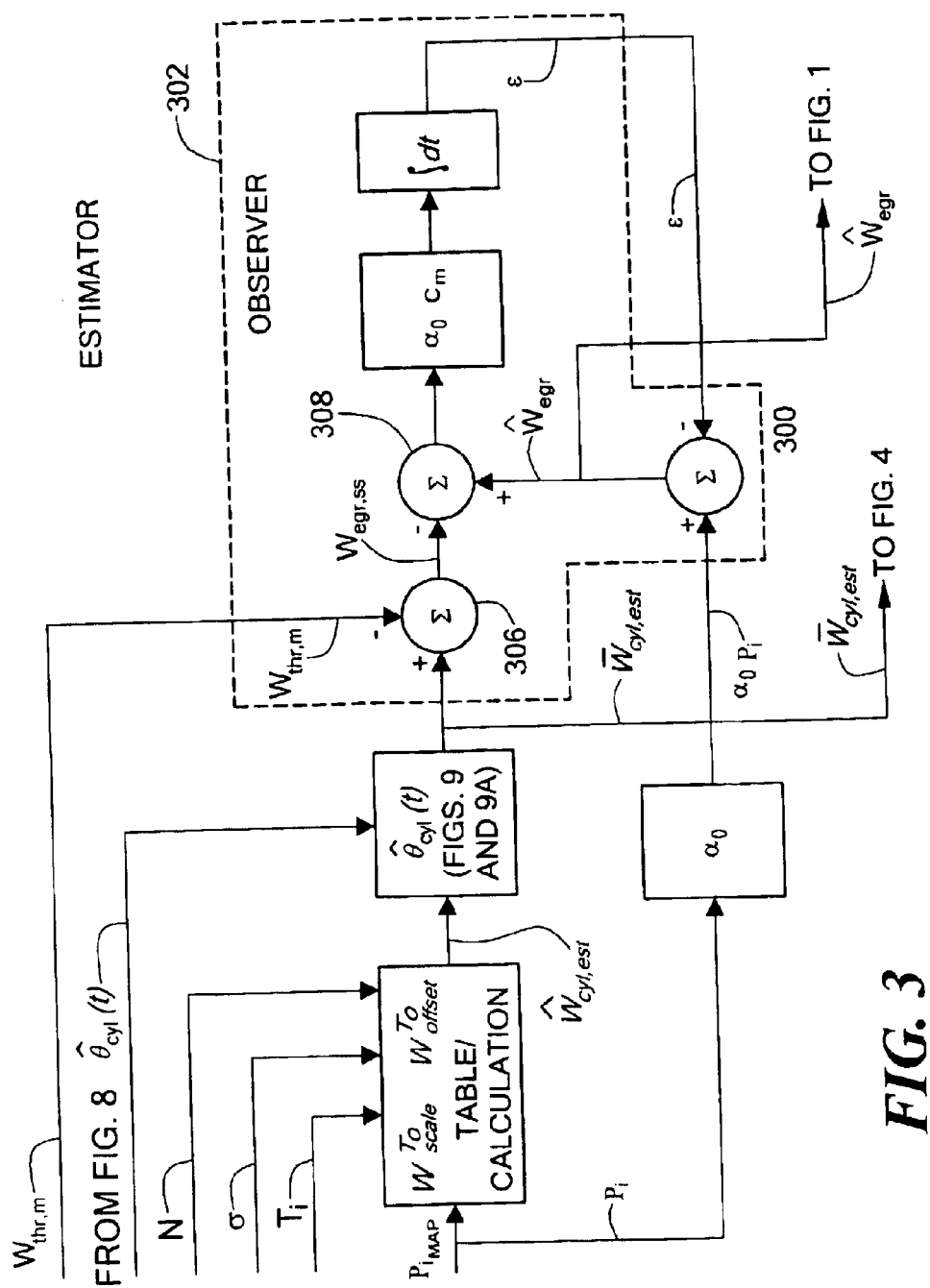
FIG. 3 is a block diagram of an estimator used in a control system for the engine of FIG. 1 according to the invention.

Assuming the measurements of the intake manifold pressure $P_i$, the throttle flow $W_{thr}$, and the estimate of the cylinder flow $W_{cyl,\,est}$ (i.e., $\hat{W}_{cyl}$) are accurate and reliable, an observer, shown in block 302 in FIG. 3, for the EGR flow can be constructed as:

$$\hat{W}_{egr}=\alpha_0 P_i-\epsilon,$$

$$\dot{\epsilon}=\alpha_0 c_m(\hat{W}_{egr}-W_{egr,ss}). \quad (8)$$

$$W_{egr,ss}=W_{cyl\,est}-W_{thr,m}$$

where $c_m$=R$T_1$/$V_1$, $T_1$, $V_i$ are the intake manifold pressure and volume respectively, $W_{egr,ss}$ is the steady state estimate of the flow through the EGR valve, $W_{thr,m}$ is the intake manifold flow measured by MAP 36 (FIG. 1).

There are a number of key benefits to using the closed-loop observer 302 instead of the orifice equation for EGR estimation. First, it does not depend on the EGR effective flow area model and therefore makes the estimate robust with respect to soot deposit buildup. Second, it does not rely on the measurements of exhaust manifold pressure and temperature, which are not available on most production vehicles. Third, the accuracy of (8) does not deteriorate as the pressure ratio across the valve approaches 1, which makes it applicable to not only naturally aspirated, but also boosted engines. Fourth, the estimation (8) is valid even if the pressure ratio exceeds 1 in the event of the back flow.

It is noted that the observer 302 includes the design parameter $\alpha_0$.

Figure 4:
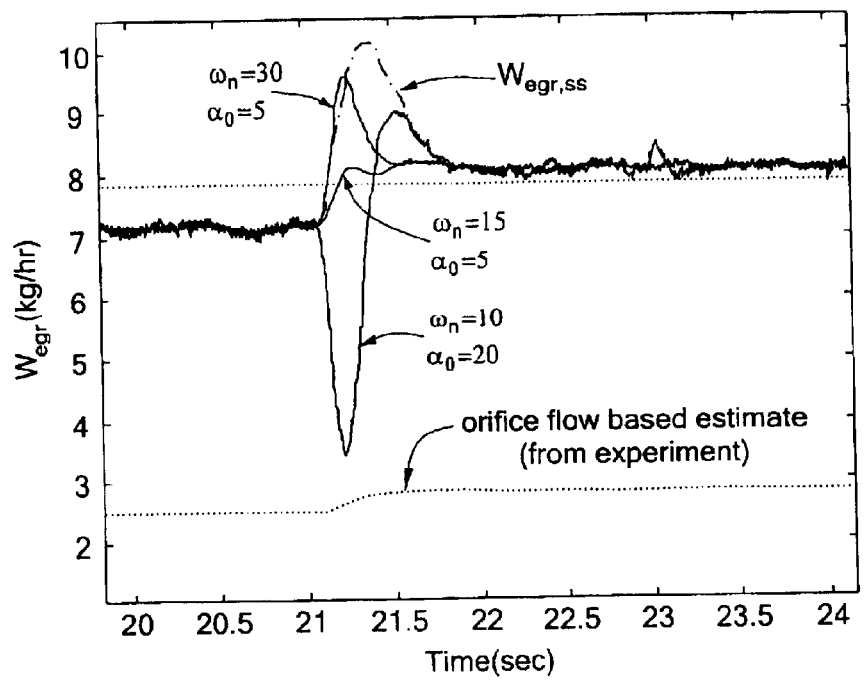
FIGS. 4, 5 and 6 are time histories useful in understanding the calibration of the estimator of FIG. 3.
Figure 5:
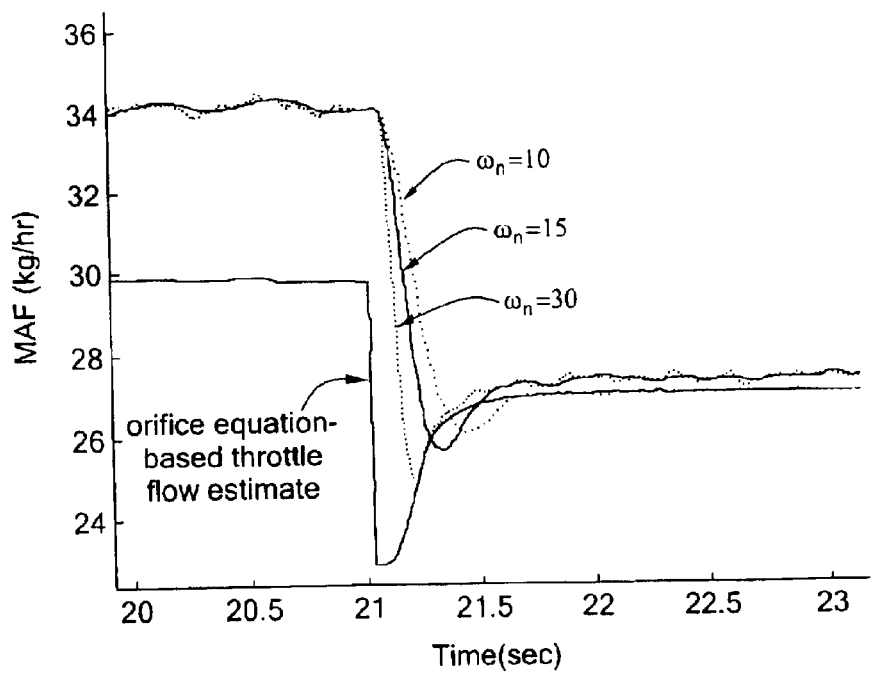

The design parameter $\alpha_0$ in (8) can be used to effect different dynamic behavior of the observer. Note that a large $\alpha_0$ may speed up the response, but it also increases the sensitivity of the estimate to the measurement noise in $P_i$ and $W_{thr,m}$. When the observer is used with a MAF signal filtered by a low-pass, second order time-domain filter, the bandwidth of this filter, $\omega_n$, can have a significant effect on the EGR flow estimate behavior. If the MAF filter is slow, then the estimate of the EGR flow may initially start in the wrong direction. If $\alpha_0$ is too small as compared to $\omega_n$, the estimate of the EGR flow may exhibit an overshoot. See FIGS. 4 and 5. The analysis of the responses shows that a fast filter for MAF signal is essential and $\alpha_0$ should be tuned so that the dynamic response of the EGR flow estimate is similar to that provided by the orifice flow equation.

When implementing the closed-loop EGR observer (8) and investigating its performance and robustness, the following issues that may impact the system performance:

Signal processing and filtering. The raw data from the MAF sensor, sampled at a fixed time rate, are very oscillatory because of the pulsation caused by engine breathing events. The magnitude of the pulsation is very large at the high intake manifold pressure while the frequency is a function of engine speed. An event-based filter is implemented to avoid the gain scheduling of the time constant of the time-domain filter. While the slow filter may help to smooth out the MAF signal, a fast filter will improve the transient performance of the EGR observer and of the other charge control functions that rely on the MAF measurements.

Cylinder flow estimation. The closed-loop observer assumes that accurate cylinder flow estimates are available. In reality, however, soot deposits in the intake system can also change the volumetric efficiency over time. This motivates the work to be discussed below on the adaptation of cylinder flow estimator.

Figure 6:
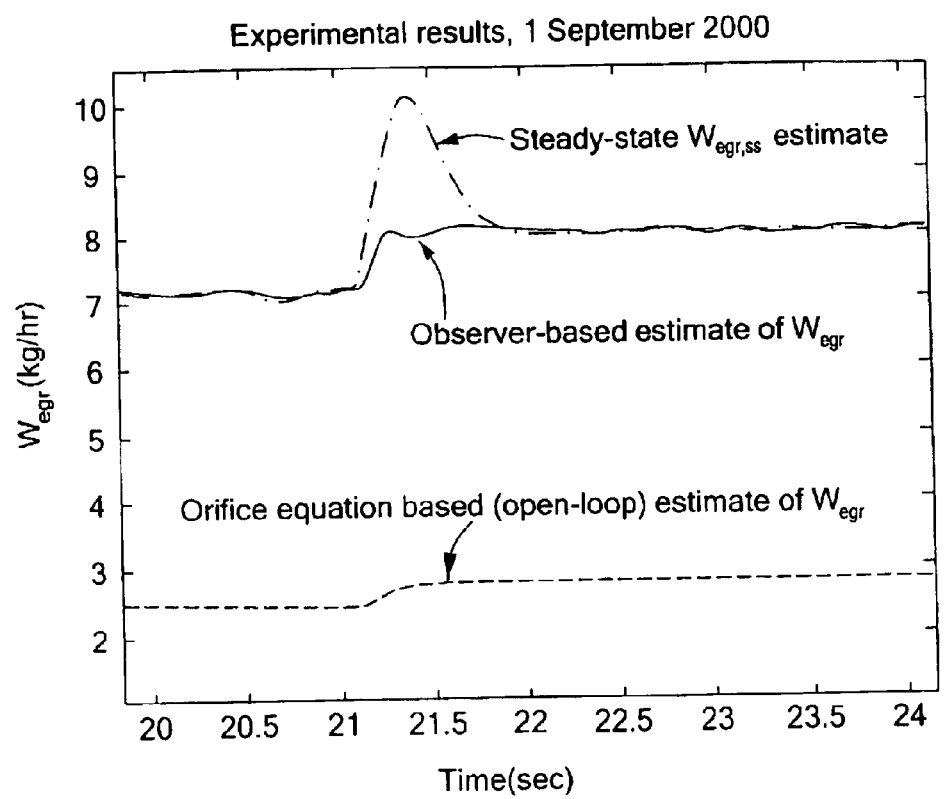

FIG. 6 shows the dynamometer validation data for the closed-loop EGR observer (8). Both the open-loop and closed-loop responses are plotted. There are two distinct features that characterize the performance of the $W_{egr}$ estimation: In steady state, $W_{egr}$ should be equal to the difference between $W_{cyl}$ and $W_{thr}$, according to mass balance. During the transient, the dynamic response of $W_{egr}$ to a step input in EGR valve position should resemble that predicted by the orifice equation. It can be seen from FIG. 6 that while the open-loop estimate has a large error in predicting the EGR flow at steady state, the closed-loop observer has the pre-described characteristics both at steady state and during the transient.

Feedback Charge Control

Referring now to FIG. 7, having established the design parameter $\alpha_0$ for the observer 302 (FIG. 3), a feedback system and method which use available measurements (MAF and MAP) and estimates to enhance the charge delivery performance despite the presence of soot deposits and other perturbing factors is shown.

As discussed above, the objectives of the charge control are to deliver desired flow $W_{cyl,d}$ and burned gas fraction $F_{in,d}$ into the cylinders. Thus, on Step 700, a determination is made, either by measurements or estimations, of intake manifold pressure, $P_i$, throttle flow, $W_{thr,m}$, exhaust manifold pressure, $P_{exh}$, ambient pressure, $P_{amb}$, ambient temperature, $T_{amb}$, exhaust gas temperature, $T_{exh}$, engine speed, N, swirl valve position, $\sigma$, intake manifold temperature, $T_i$ and exhaust gas stoichiometric ratio, $r_{exh}$. Accelerator pedal position, PP, is also detected, Step 702.

Having obtained these parameters, the setpoints corresponding to the desired cylinder air charge, $W_{cyl,d}$, the desired intake manifold pressure $P_{i,d}$, and the desired EGR flow $W_{egr,d}$ are established, Step 304. Since the current values for these three variables are either measured or estimated, feedback control can be designed to close the loop around MAF, MAP and $\hat{W}_{egr}$ to reduce tracking errors thereby improving performance.

It is also noted that the following functions are also calculated in Step 706:

$$f_1 = f\left(\frac{P_{amb}}{\sqrt{T_{amb}}}, \frac{P_i}{P_{amb}}\right)$$

$$f_2 = f\left(\frac{P_{exh}}{\sqrt{T_{exh}}}, \frac{P_i}{P_{exh}}\right)$$

There are many different approaches that can be adopted for feedback control design in this application. For example, one can choose a decentralized control architecture, close the loop on MAF for the throttle control to deliver $W_{thr,d}$, and close the loop on MAP to deliver $P_{i,d}$ or $W_{egr,d}$. Conventional proportional-integral-derivative (PID) control can be used to eliminate the steady state error and to shape the transient behavior. Here, the control law derived uses the Speed Gradient method which provides a nonlinear variant of a proportional-integral (PI) controller.

Consider the objective function $$Q = \frac{1}{2}\gamma_1(P_i - P_{i,d})^2 + \qquad (9)$$
$$\frac{1}{2}\gamma_2(\hat{W}_{egr} - W_{egr,d})^2 + \frac{1}{2}\gamma_3(W_{thr,m} - W_{thr,d})^2$$

which measures the deviation of $P_i$, $\hat{W}_{egr}$, $W_{thr,m}$ from their setpoints, where $W_{thr,m}$ is the measured air flow through the throttle. Using the Speed Gradient method, the control law that dynamically minimizes the objective function (9) takes the following generic form $$u = u_d - \Gamma_1 \nabla_u \dot{Q} - \Gamma_2 z, \quad \dot{z} = \nabla_u \dot{Q} \qquad (10)$$

where $u_d$ is the nominal feedforward control, $\Gamma_1$, $\Gamma_2$ are the gain matrices, $\dot{Q}$ is the time rate of change of Q along the trajectories of the system. Note that $$\dot{Q} = \gamma_1(P_i - P_{i,d})\dot{P}_i + \gamma_2(\hat{W}_{egr} - W_{egr,d})\dot{\hat{W}}_{egr} + \gamma_3(W_{thr,m} - W_{thr,d})\dot{W}_{thr,m}$$

by assuming that the setpoints change slowly in time as compared to the intake manifold and sensor dynamics. Thus, $$\dot{Q} = \gamma_1(P_i - P_{i,d})\dot{P}_i + \gamma_2(\hat{W}_{egr} - W_{egr,d})(\alpha_0 \dot{P}_i - \dot{\epsilon}) + \gamma_3(W_{thr,m} - W_{thr,d})\dot{W}_{thr,m} \quad (11)$$

where $\hat{W}egi = \beta_0 P_i - \epsilon$ is used to eliminate $\dot{\hat{W}}$ in (11). Using the intake manifold and sensor dynamic equations $$\dot{P}_i = c_m(W_{thr} + W_{egr} - W_{cyl}) \qquad (12)$$

$$\dot{W}_{thr,m} = -\lambda_M W_{thr,m} + \lambda_M W_{thr} \qquad (13)$$

and the EGR flow observer equation (8), where $c_m = RT_i/V_i$ is defined in (8), $1/\lambda_M$ is the sensor time constant, the time rate of change of Q can be evaluated as:

$$Q = \gamma_1(P_i - P_{i,d})c_m(W_{thr} + W_{egr} - W_{cyl}) + \qquad (14)$$
$$\gamma_2(\hat{W}_{egr} - W_{egr,d})\alpha_0 c_m(W_{egr} - \hat{W}_{egr} + W_{cyl,est} - W_{cyl}) +$$
$$\gamma_3(W_{thr,m} - W_{thr,d})(-\lambda_M W_{thr,m} + \lambda_M W_{thr})$$

Now $u_{thr}$ and $u_{egr}$, are treated as the effective flow areas for the throttle and EGR valves and are treated as the control variables. Noting that $W_{thr}$ and $W_{egr}$ are directly related to the control actions $u_{thr}$, $u_{egr}$, $$\frac{\partial \dot{Q}}{\partial u_{thr}} = (\gamma_1 c_m (P_i - P_{i,d}) + \gamma_3 (W_{thr,m} - W_{thr,d})\lambda_M) \frac{\partial W_{thr}}{\partial u_{thr}} \quad (15)$$

$$= (\gamma_1 c_m (P_i P_{i,d}) + \gamma_3 (W_{thr,m} - W_{thr,d})\lambda_M) f\left(\frac{P_{amb}}{\sqrt{T_{amb}}}, \frac{P_i}{P_{amb}}\right)$$

$$\frac{\partial \dot{Q}}{\partial u_{egr}} = (\gamma_1 c_m (P_i - P_{i,d}) + \gamma_2 (\hat{W}_{egr,m} - W_{egr,d})\alpha_0 c_m) \frac{\partial W_{egr}}{\partial u_{egr}} \quad (16)$$

$$= (\gamma_1 c_m (P_i - P_{i,d}) + \gamma_2 (W_{egr} - W_{egr,d})\lambda_M) f\left(\frac{P_{exc}}{\sqrt{T_{exec}}}, \frac{P_i}{P_{aexc}}\right)$$

Choosing diagonal matrices for $\Gamma_1$, $\Gamma_2$, the final combined feedback and feedforward charge control takes the form of:

$$u_{thr} = u_{thr,d} - \Gamma_{11} \frac{\partial \dot{Q}}{\partial u_{thr}} - \Gamma_{12} z_1; \qquad \dot{z}_1 = \frac{\partial \dot{Q}}{\partial u_{thr}} \quad (17)$$

$$u_{egr} = u_{egr,d} - \Gamma_{21} \frac{\partial \dot{Q}}{\partial u_{egr}} - \Gamma_{22} z_2; \qquad \dot{z}_2 = \frac{\partial \dot{Q}}{\partial u_{egr}} \quad (18)$$

where $\Gamma_{11}$, $\Gamma_{21}$, $\Gamma_{21}$, $\Gamma_{22}$ are positive constants, and the feedforward portion $u_{thr,d}$, $u_{egr,d}$ are given by (5) and (6).

The resulting feedback controls (17) and (18) are in a special form of nonlinear PI (proportional and integral) control, where the feedback gains are automatically scaled based on plant's and actuator's nonlinear characteristics.

Thus, from the above, and referring again to FIG. 7, a throttle signal, $u_{thr}$, generator 708 and an EGR valve signal, $u_{egr}$, generator 710 are shown which implement the equations described above. More particularly, considering first the throttle signal, $u_{thr}$, generator 708, the difference between the measured throttle flow, $W_{thr,m}$ and the desired throttle flow, $W_{thr,d}$, is multiplied by $\gamma_3$, and the product multiplied by $\lambda_m$ to produce one input to summer 712. The other input to summer 712 is the result of determining the difference between the measured intake manifold pressure $P_i$ and the desired intake manifold pressure, $P_{i,d}$, and multiplying such difference by $\gamma_1$ and $c_m$. The output of summer 712 is multiplied by $\Gamma_{11}$ and the product is fed as one input to differencer 714. The output of summer 712 is integrated over time by integrator 716. The output of the integrator 716 is multiplied by $\Gamma_{12}$ and the product is fed as one input to differencer 718, as shown. The desired throttle flow, $W_{thr,d}$, established in Step 704 is converted into a desired throttle position signal, $u_{thr,d}$, by dividing such desired throttle flow, $W_{thr,d}$ by $f_1$, where $f_1$ was calculated in Step 706. The difference between $u_{thr,d}$ and $\Gamma_{11}\{\gamma_1\ c_m(P_i-P_{i,d})+\gamma_3\lambda_M (W_{thr,m}-W_{thr,d})\}\ f_1$ produced by differencer 714, i.e., $u_{thr,d} - [\Gamma_{11}\{\gamma_1(P_i-P_{i,d})+\gamma_3\lambda_M(W_{thr,m}-W_{thr,d})\}]\ f_1$, is fed to differencer 718 to produce the throttle command, $u_{thr}$, for the electronically controlled throttle 26 (FIG. 1).

Before describing the EGR valve control signal, $u_{egr}$, generator 710 (FIG. 7), reference is again made to FIG. 3. FIG. 3 shows an estimator 304 for estimating $W_{egr}$, i.e., $\hat{W}_{egr}$. After determining the design parameter $\alpha_0$ for a particular engine design, as described above in connection with the observer 302, the estimator 304 determines, i.e., estimates, $\hat{W}_{egr}$. More particularly, estimated cylinder flow, $\hat{W}_{cyl}$, is calculated from $P_i$, $T_i$, $\sigma$, and N in accordance with equation (7) above:

$$\hat{W}_{cyl} = \frac{T_0}{T_i}(W^{T_0}_{offset}(N, \sigma) + W^{T_0}_{scale}(N, \sigma)P_i).$$

Figure 7A:
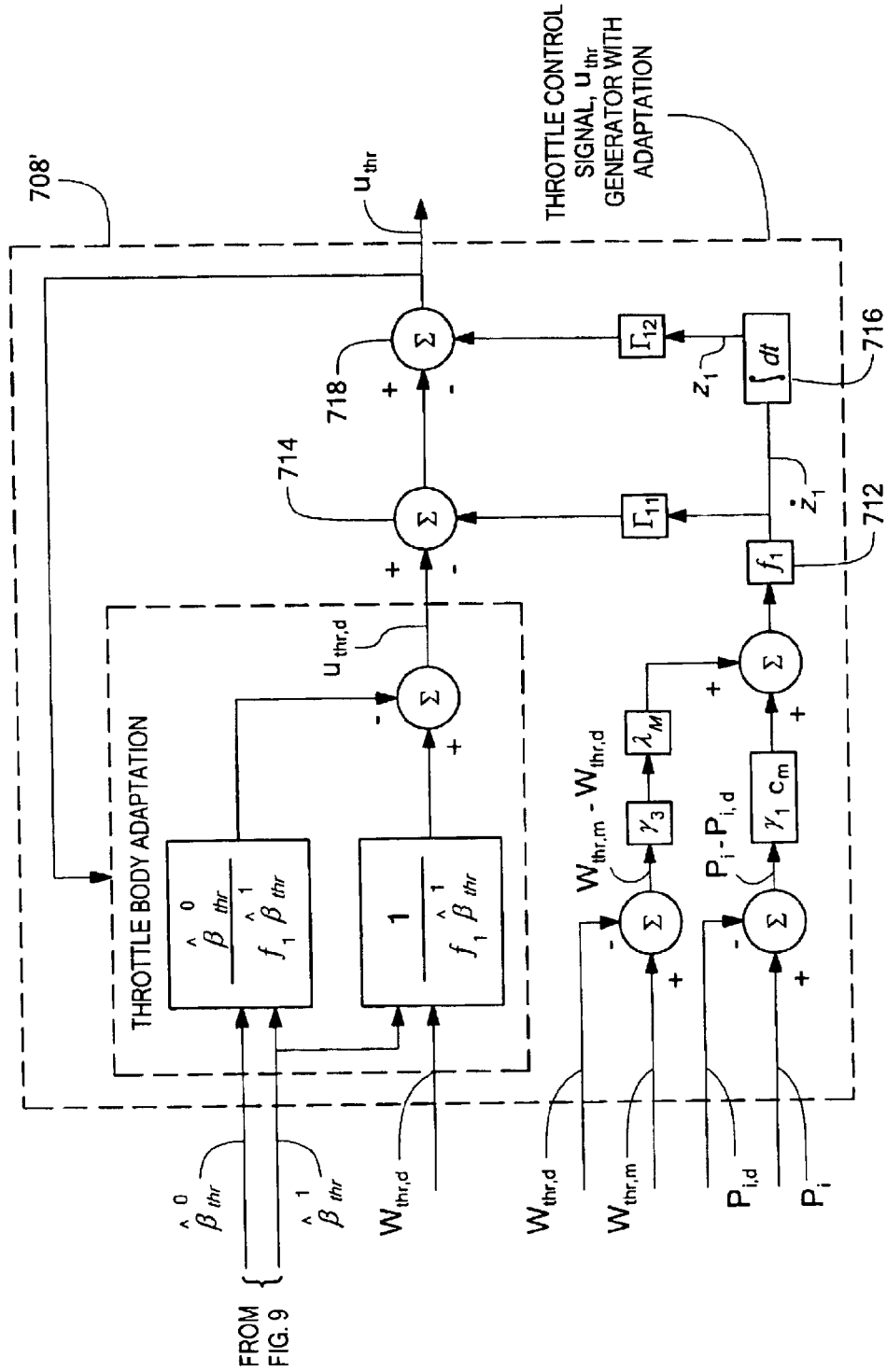
FIG. 7A is a block diagram of the throttle control system of FIG. 7 when throttle body adaptation is used according to the invention.
Figure 8:
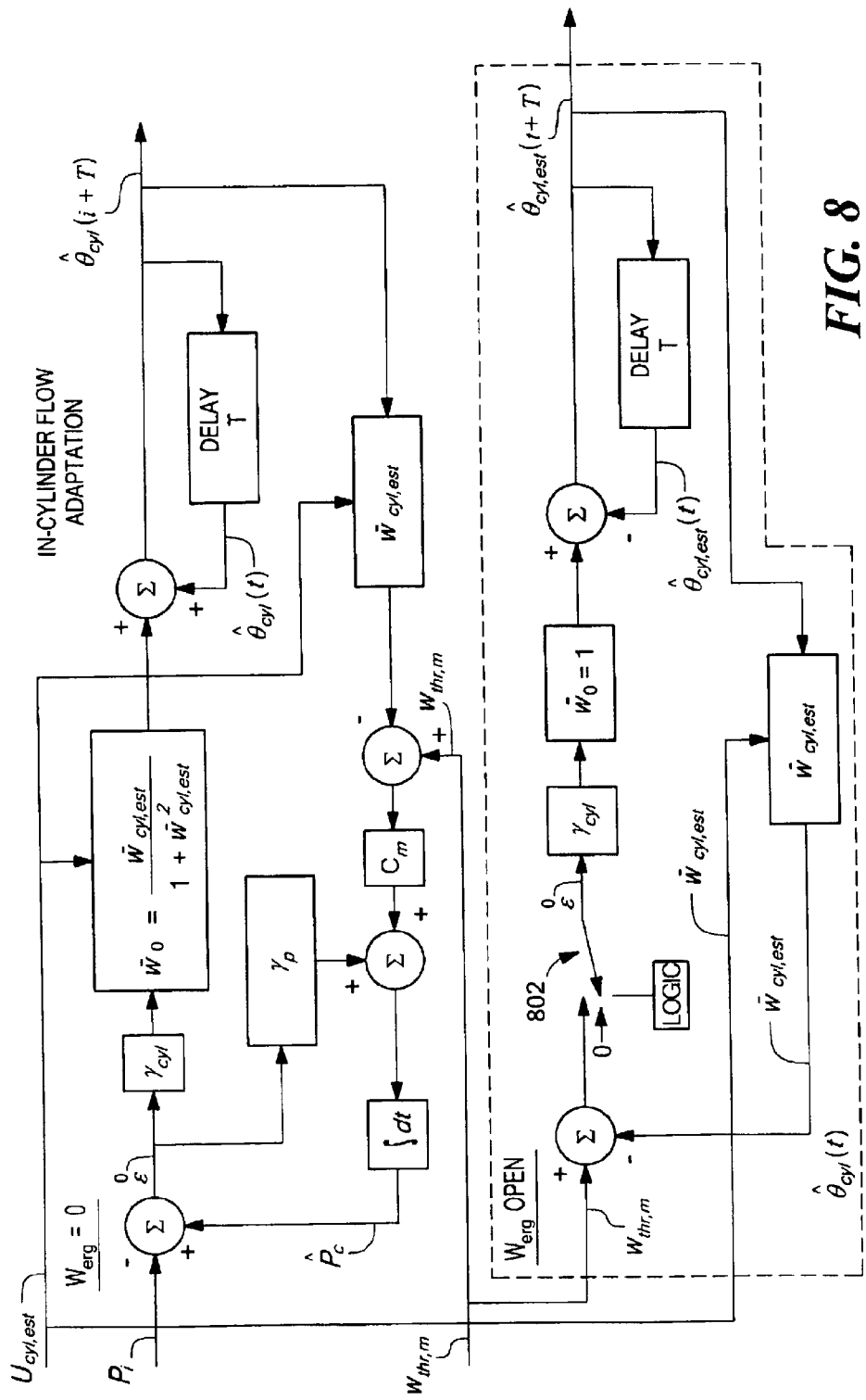
FIG. 8 is a block diagram of an in-cylinder flow adapter used in the system of FIG. 7 according to the invention.

The estimated cylinder flow, $\hat{W}_{cyl}$, is multiplied by a factor, $\hat{\theta}_{cyl}$ (t), to be described in more detail below in connection with throttle body adaptation and in-cylinder adaptation (FIGS. 7A and 8). Suffice it to say here, however, that without throttle body adaptation $\hat{\theta}_{cyl}$ (t) is 1.0. Thus, without adaptation, $\hat{W}_{cyl}$, is fed to a differencer 306 along with measured throttle flow, $W_{thr,m}$ to produce $\hat{W}_{cyl}-W_{thr,m}=W_{egr,ss}$. The output of differencer 306, $W_{egr,ss}$ is fed to a differencer 308. It is also noted that the measured manifold absolute pressure, $P_i$ is multiplied by $\alpha_0$. The product, $\alpha_0 P_i$, is fed to differencer 300 along with the observer value $\epsilon$. The observer value $\epsilon$ is formed by multiplying the output of differencer 308 by $\alpha_0 c_m$ and integrating the product over time, as indicated in FIG. 3. The difference between $\epsilon$ and $\alpha_0 P_i$ (i.e., $\alpha_0 P_i - \epsilon$), is the estimated EGR flow, $\hat{W}_{egr}$. The loop is closed by feeding the estimated EGR flow, $\hat{W}_{egr}$, as a second input to differencer 308.

Referring again to FIG. 7, the EGR valve control signal, $W_{egr}$, generator 710 is shown to produce, in differencer 720, the difference between the desired EGR flow, $W_{egr,d}$ established in Step 704 and the estimated EGR flow, $\hat{W}_{egr}$, produced by the estimator 304 (FIG. 3). The EGR valve control signal, $u_{egr}$, generator 710 also produces, in differencer 722, the difference between the desired pressure, $P_{i,d}$ and measure pressure, $P_i$. The output of differencer 720 is multiplied by $\alpha_0 c_m \gamma_2$ and such product is added, in summer 724 to the product of $\gamma_1$, $c_m$, and $P_i - P_{i,d}$ (produced by differencer 722), where $f_2$ was calculated in Step 706. Thus, the output of summer 724 is: $\{\gamma_1 c_m (P_i - P_{i,d}) + \gamma_2 \alpha_0 c_m (\hat{W}_{egi} - W_{egr,d})\}$. The output of summer 724 is multiplied by $f_2$ and then multiplied by $\Gamma_2$ and the product is fed as one input to differencer 726; and, is integrated over time by integrator 728. The output of the integrator 728 is multiplied by $\Gamma_{22}$ and the product is fed as one input to differencer 730, as shown. The desired EGR flow, $W_{egr,d}$, established in Step 704 is converted into a desired EGR valve position signal, $u_{egr,d}$, by dividing such desired EGR flow, $W_{egr,d}$ by $f_2$, where $f_2$ was calculated in Step 706. The difference between $u_{egr,d}$ and $\Gamma_{21}\{\gamma_1\ c_m(P_i-P_{i,d})+\gamma_2\alpha_0 c_m(\hat{W}_{egr}-W_{egr,d})\}$ produced by differencer 724, i.e., $u_{egr,d}-[\Gamma_{21}\{\gamma_1\ c_m\ (P_i-P_{i,d})+\gamma_2\alpha_0 c_m(\hat{W}_{egr}-W_{egr,d})\}]$, is fed to differencer 730 to produce the EGR valve command, $u_{egr}$, for the EGR valve 34 (FIG. 1).

One convenient feature of the Speed-Gradient controller is that it provides an intuitive tuning procedure. By adjusting the relative weights $\gamma_1$, $\gamma_2$, $\gamma_3$ in the objective function (9), one can effectively shape the behavior of the closed-loop response to enforce desired response characteristics. For example, as the intake manifold pressure approaches the ambient condition, forcing $P_i$ to track $P_{i,d}$ using throttle or EGR valve will cause actuator saturation, since the actuators to have weak controllability over the pressure tracking performance at high intake manifold pressure. With the flexibility built into the controller, one can adjust the value of $\gamma_1$ under this condition to avoid undesirable integrator windup.

Several adaptive algorithms are described below for in-cylinder flow and throttle flow estimation.

Throttle Body Model Adaptation

Given that the anticipated variations in the throttle flow characteristics are in the slope and leakage terms in the throttle angle to effective flow area function, the uncertainties in the flow through the throttle body are parameterized with an offset $\beta_{thr}^0$ (nominal value $\beta_{thr}^{0n}=0$) and a multiplier, or scale, $\beta_{thr}^1$ (nominal value $\beta_{thr}^{1n}=1$):

$$W_{thr}=\beta_{thr}^0+\beta_{thr}^1 \overline{W}_{thr}$$

where $\overline{W}_{thr}$ is the nominal throttle cylinder flow predicted by the orifice equation (1) based on a nominal calibration. Let $\hat{\beta}_{thr}{}^0$, $\hat{\beta}_{thr}{}^1$ be the estimated value for $\beta_{thr}{}^0$ and $\beta_{thr}{}^1$ at time t, respectively. A gradient-type adaptation algorithm is defined as follows:

$$\hat{\beta}_{thr}^0(t+T_a) = \hat{\beta}_{thr}^0(t) + \gamma_{thr}^0 \varepsilon_{thr} \frac{1}{1+\overline{W}_{thr}^2}$$

$$\hat{\beta}_{thr}^1(t+T_a) = \hat{\beta}_{thr}^1(t) + \gamma_{thr}^1 \varepsilon_{thr} \frac{\overline{W}_{thr}}{1+\overline{W}_{thr}^2}$$

$$\varepsilon_{thr} = W_{thr,m} - \hat{W}_{thr};\ \hat{W}_{thr} = \hat{\beta}_{thr}{}^0 + \hat{\beta}_{thr}{}^1 \overline{W}_{thr}$$

where $\gamma_{thr}{}^0$, $\gamma_{thr}{}^1$, are adaptation gains.

Thus, referring to FIG. 7A, a throttle control signal, $u_{thr}$, generator 708' with adaptation is shown. This throttle control signal, $u_{thr}$, generator 708' with adaptation would be substituted for the throttle control signal, $u_{thr}$, generator 708 without adaptation shown in FIG. 7 and described above. Thus, the difference between the measured throttle flow, $W_{thr,m}$ and the desired throttle flow, $W_{thr,d}$, is multiplied by $\gamma_3$, and the product multiplied by $\lambda_m$ to produce one input to summer 712. The other input to summer 712 is the result of determining the difference between the measured intake manifold pressure $P_i$ and the desired intake manifold pressure, $P_{i,d}$, and multiplying such difference by $\gamma_1 c_m$. The output of summer 712 is multiplied by $\Gamma_{11}$ and the product is fed as one input to differencer 714 and is integrated over time by integrator 716. The output of the integrator 716 is multiplied by $\Gamma_{12}$ and the product is fed as one input to differencer 718, as shown.

The throttle control signal, $u_{thr}$, generator 708' with adaptation, $u_{thr,d}$ is established by forming:

$$\frac{\hat{\beta}_{thr}^0}{f_1 \hat{\beta}_{thr}^1} \text{ and } \frac{1}{f_1 \hat{\beta}_{thr}^1}$$

from estimated values, $\hat{\beta}_{thr}{}^0$ and $\hat{\beta}_{thr}{}^1$ of $\beta_{thr}{}^0$ and $\beta_{thr}{}^1$, respectively, from a throttle body adapter 900 to be described in more detail in connection with FIG. 9. Suffice it to say here, however, that the desired throttle flow, $W_{thr,d}$ is multiplied by $$\frac{1}{f_1 \hat{\beta}_{thr}^1}$$

the product has subtracted from it $$\frac{\hat{\beta}_{thr}^0}{f_1 \hat{\beta}_{thr}^1}$$

to produce the desired throttle position signal, $u_{thr,d}$, as shown. This desired throttle position signal, $u_{thr,d}$ is fed to differencer 714 along with $\Gamma_{11}\{\gamma_1 c_m(P_i-P_{i,d})+\gamma_3\lambda_M(W_{thr,m}-W_{thr,d})\}f_1$ to produce $u_{thr,d}-[\Gamma_{11}\{\gamma_1 c_m(P_i-P_{i,d})-\gamma_3\lambda_M(W_{thr,m}-W_{thr,d})\}]$ $f_1$ which is fed to differencer 718 to produce the throttle command, $u_{thr}$, for the electronically controlled throttle 26 (FIG. 1).

Figure 9:
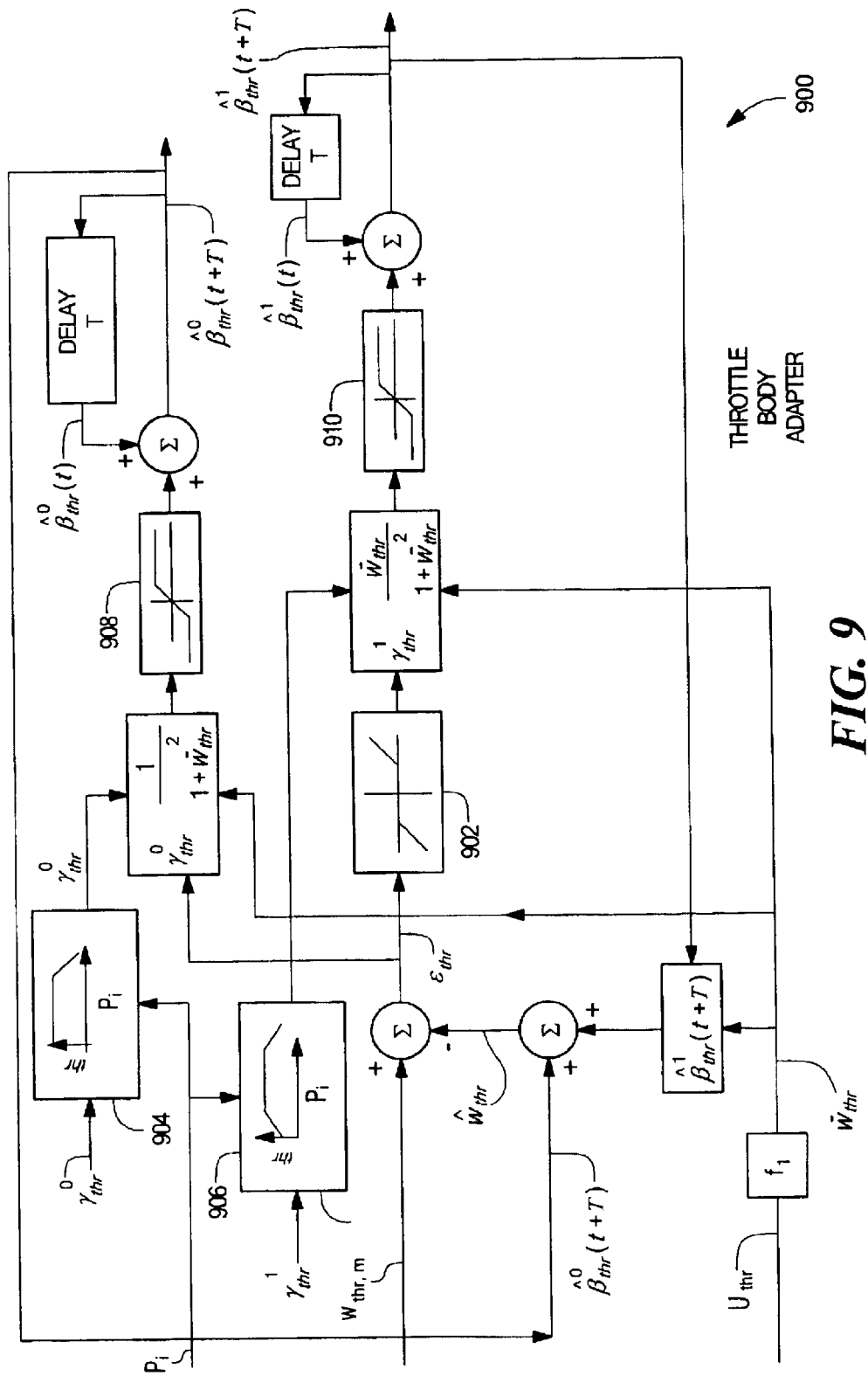
FIG. 9 is a block diagram of an throttle body adapter used in the system of FIG. 7 according to the invention.

Referring now to FIG. 9, the throttle body adapter 900 is shown to produce, in response to measured throttle flow, $W_{thr,m}$ and throttle control signal $u_{thr}$ produced by differencer 718, FIG. 7A, the estimated values, $\hat{\beta}_{thr}{}^0$ and $\hat{\beta}_{thr}{}^1$ of $\beta_{thr}{}^0$ and $\beta_{thr}{}^1$, respectively. Thus, as described from the equations above, the error $\varepsilon_{thr}$ is determined as follows:

$$\hat{\beta}_{thr}^0(t+T_a) = \hat{\beta}_{thr}^0(t) + \gamma_{thr}^0 \varepsilon_{thr} \frac{1}{1+\overline{W}_{thr}^2}$$

$$\hat{\beta}_{thr}^1(t+T_a) = \hat{\beta}_{thr}^1(t) + \gamma_{thr}^1 \varepsilon_{thr} \frac{\overline{W}_{thr}}{1+\overline{W}_{thr}^2}$$

$$\varepsilon_{thr} = W_{thr,m} - \hat{W}_{thr};\ \hat{W}_{thr} = \hat{\beta}_{thr}{}^0 + \hat{\beta}_{thr}{}^1 \overline{W}_{thr}$$

where $\gamma_{thr}{}^0$, $\gamma_{thr}{}^1$, are adaptation gains.

Figure 7B:
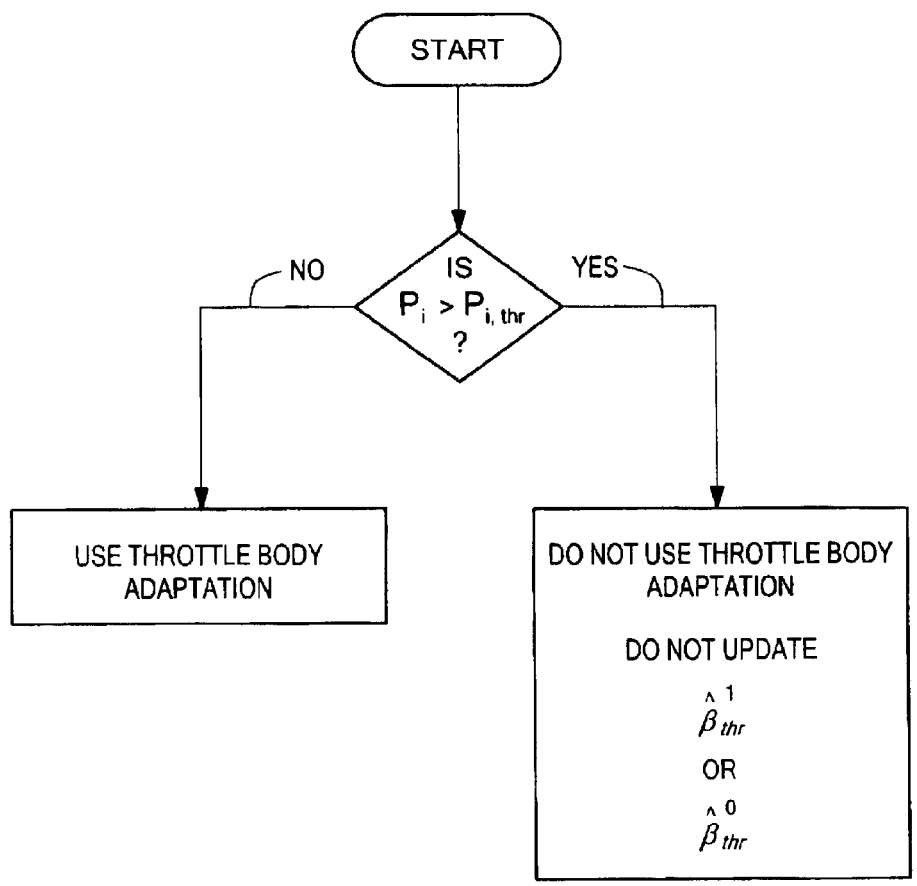
FIG. 7B is a flow diagram useful in understanding when adaptation of FIG. 7A is used by the control system of FIG. 7.

The actual implementation of the adaptation law is more complex and requires that various practical issues be handled. Specifically:

1. Adaptation is disabled when the intake manifold pressure is high and the throttle is going through a fast transient. Under these conditions the orifice equation does not predict the throttle flow very well and the MAF sensor reading (especially when filtered) may lag behind the actual signal. Thus, referring to FIG. 7B, if $P_i > P_{i,threshold}$ adaptation is disabled and, referring to FIG. 9, $\hat{\beta}_{thr}{}^1(t+T) = \hat{\beta}_{thr}{}^1(t)$ and $\hat{\beta}_{thr}{}^0(t+T) = \hat{\beta}_{thr}{}^0(t)$. It is noted that under such condition, FIG. 7 and FIG. 7A are the same;

2. A dead-zone 902 in FIG. 9 is applied to the prediction error $\varepsilon_{thr}$ before it is used in adaptation. This avoids parameter drifts caused by unmodelled dynamics and reinforces the robustness of the adaptive system; and 3. The adaptation gains $\gamma_{thr}{}^0$, $\gamma_{thr}{}^1$ are made to be signal dependent. Both gains are reduced at high manifold pressure. The gain $\gamma_{thr}{}^0$ for the offset adaptation is reduced at high flow condition, as shown by block 904 in FIG. 9, while the gain $\gamma_{thr}{}^1$ for the scale adaptation is reduced at low flow condition, as shown by block 906 in FIG. 9.

4. Both the offset $\beta_{thr}{}^0$ and scale $\beta_{thr}{}^1$ are limited to vary within a predetermined range, as shown by blocks 908 and 910, respectively, in FIG. 9 and an error-governor projection scheme is implemented to enforce the limits. The error governor reduces the adaptation gains when needed to ensure that the parameter estimates fall within the predetermined range.

Figure 10:
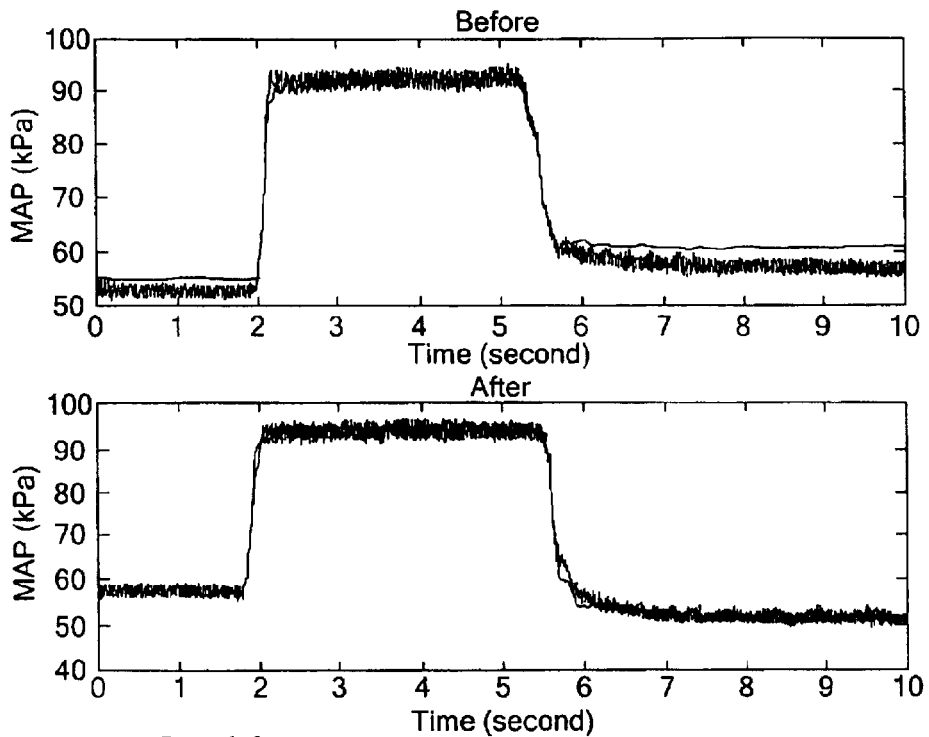
FIGS. 10–13 are time histories of various engine parameters using the control system of FIGS. 7 and 7A.

To demonstrate the effect of throttle adaptation, throttle steps are applied, with closed EGR valve, before and after adaptation is completed. The measured and estimated intake manifold pressure responses are compared where the estimated intake manifold pressure is generated by an isothermal model, $\hat{P} = K_1 T_1(\hat{W}_{thr} - \hat{W}_{cyl})$. If the throttle flow is estimated accurately, the estimated pressure should be close to measured pressure. FIG. 10 compares the responses before and after the adaptation, confirming that the accuracy is much improved after the adaptation is completed. More particularly, FIG. 10 shows time histories of estimated and measured intake manifold pressure response before and after adaptation according to the invention.

In-Cylinder Flow Adaptation

Adaptation for the in-cylinder flow is used to compensate for variations in the intake system that might be due to soot deposits, other aging and component-to-component variations. This adaptation is essential given that (i) the intake system soot deposits on a DISI engine are inevitable due to the high EGR volume and stratified operation, and (ii) other key EMS functions, such as fuel control and the closed-loop EGR observer, depend on accurate in-cylinder flow estimate to achieve desired performance.

Since soot deposits blocking the charge flow passage and therefore reducing volumetric efficiency are a primary concern, a multiplier is introduced to the cylinder flow equation (3) and its value is updated on-line. A gradient-type algorithm similar to that used for throttle adaptation is used for in-cylinder charge flow:

$$W_{cyl,est} = \hat{\theta}_{cyl} \overline{W}_{cyl,est}(N, P, \sigma)$$

$$\hat{\theta}_{cyl}(t+T_a) = \hat{\theta}_{cyl}(t) + \gamma_{cyl} \epsilon^0 \overline{W}^0$$

where $\overline{W}_{cyl,est}$ is the nominal estimate of the cylinder flow assuming $\hat{\theta}_{cyl}=1$, $\epsilon^0$ and $\overline{W}^0$ are the error and regressor signals for adaptation, respectively. Thus, referring to FIG. 9, depending on the EGR valve position, there are two different adaptation schemes:

If the EGR valve is closed ($W_{egr}=0$), (shown in the upper portion of FIG. 9)

$$\overline{W}^0 = \frac{\overline{W}_{cyl,est}}{1 + \overline{W}_{cyl,est}^2}$$

is selected and the error signal $\epsilon^0$ is defined to be the difference between the measured and calculated intake manifold pressure:

$$\dot{P}_c = c_m(W_{thr} - \hat{\theta}_{cyl}\overline{W}_{cyl,est}(N, P, \sigma)) + \gamma_p(P_i - \hat{P}_c)$$

$$\epsilon^0 = \hat{P}_c - P_i$$

where $\gamma_p$ is the observer gain. In this case, the estimation error in the intake manifold pressure is mainly due to the error in the cylinder flow estimation (assuming the flow through the throttle is accurately measured and the EGR valve is closed). The sign and magnitude of the pressure error $\hat{P}_c - P_i$ reflect the error in $\hat{\theta}_{cyl}$ and therefore is used to drive the adaptation for $\hat{\theta}_{cyl}$.

If the EGR valve is open, shown in the lower portion of FIG. 8, then there are possibly multiple sources for error in the intake manifold model, including inaccurate estimation of the EGR flow. In this case, $$\overline{W}^0 = 1$$

is used and $$\epsilon^0 = W_{thr} - \hat{\theta}_{cyl}\overline{W}_{cyl,est} \text{ if } W_{thr} - \hat{\theta}_{cyl}\overline{W}_{cyl,est} > \delta_0$$

otherwise, $$\epsilon^0 = 0$$

as represented by switch 802 and logic in FIG. 8 and where $\delta_0 \geq 0$ is a threshold value. The logic behind the algorithm is the following: if $W_{thr} - \hat{\theta}_{cyl}\overline{W}_{cyl,est}$ is larger than zero or a positive threshold value, that implies more air is flowing through the throttle body than into the cylinders, and this is impossible in steady state given that EGR valve is open.

Consequently, the speed-density equation underestimates the flow and therefore the multiplier $\hat{\theta}_{cyl}$ is adjusted upwards. Although this is not done here, it is possible to handle even more general situations when lower and upper bounds on the EGR flow are known for each time instant, e.g., on the basis of an open-loop model and bounds on parameter errors in that model. In this case, a set of feasible values of $\hat{\theta}_{cyl}$ that are consistent (i.e., not falsified) with the bounds on the EGR flow can be obtained. The intersections of these sets of feasible values are referred to as the information sets and their intersection over different time instances, can then be used to narrow down the set of feasible choices for $\hat{\theta}_{cyl}$, as discussed in "Adaptive Identi-fication Schemes in Presence of Bounded Disturbances: An Automotive Case Study," by I. Kolmanovsky and I. Siverguina, {Proceedings of 2001 IEEE Conference on Decision and Control}, Orlando, Fla., December, 2001.

Like the adaptation for the throttle body function, the adaptation for the cylinder flow also has to be conditioned to ensure performance and robustness. In particular, the following rules are applied to the cylinder flow adaptation:

Adaptation is disabled, i.e., $\hat{\theta}_{cyl}(t+T) = \hat{\theta}_{cyl}(t)$ in FIG. 3 under one of the following conditions:

1. during transients.
2. at very high intake manifold pressure.
3. when the magnitude of the error signal $\epsilon^0$ is very small.

An error governor similar to the one used for throttle adaptation is applied to provide a projection function, which prevents the estimate $\hat{\theta}_{cyl}$ from leaving a pre-determined range.

Figure 11:
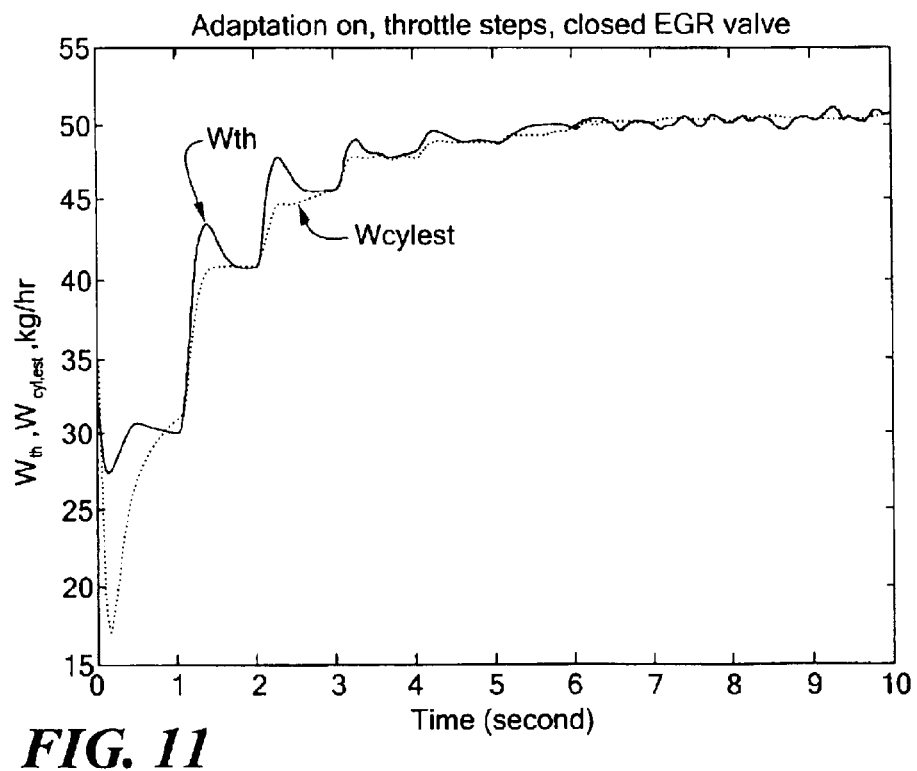
Figure 12:
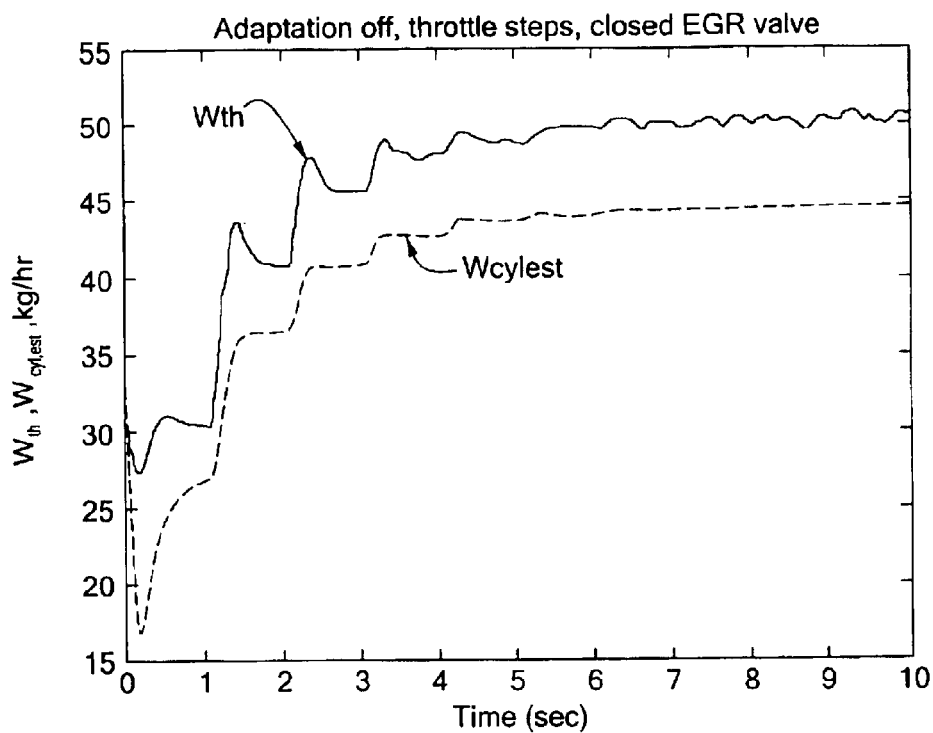
Figure 13:
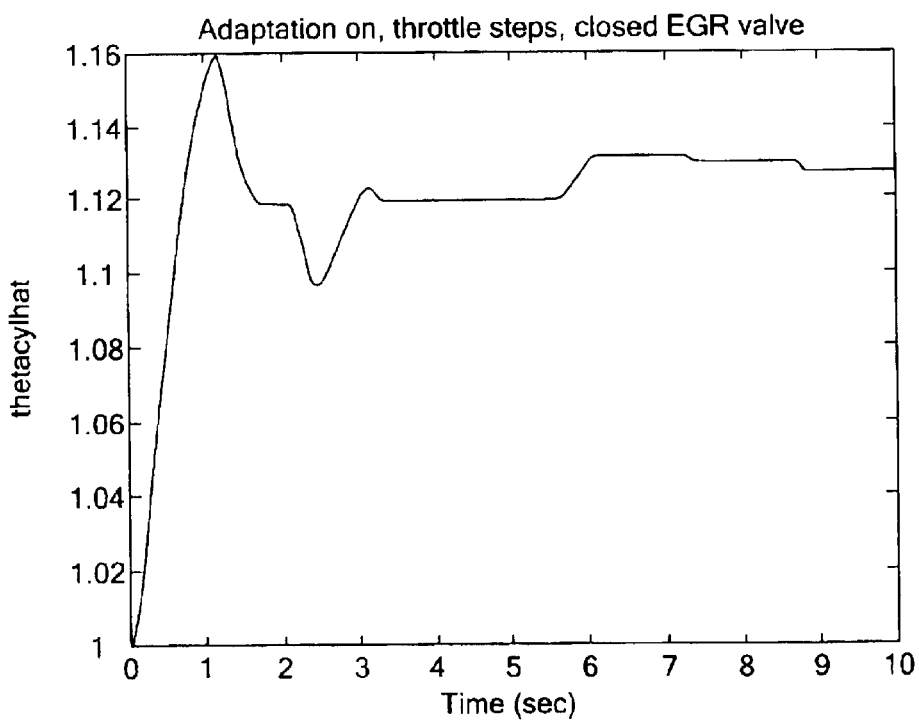

FIGS. 11–12 show the effects of cylinder flow adaptation during throttle steps when the EGR valve is closed. More particularly, FIG. 11 is a time history showing measured throttle flow (solid) and estimated cylinder air flow (dashed) in response to throttle steps. Adaptation is turned on at time t=0. Since the EGR valve is closed, in the steady-state the estimate of cylinder flow must match the measurement of throttle flow. FIG. 12 is a time history of measured throttle flow (solid) and estimated cylinder flow (dashed) in response to throttle steps, when adaptation is off. Since EGR valve is closed, in the steady-state the estimate of cylinder flow must match the measurement of throttle flow; however, as shown, it does not, since as noted above, adaptation is off. FIG. 13 is a time history showing the behavior of $\hat{\theta}_{cyl}$ as the adaptation proceeds.

A number of embodiments of the invention have been described. Nevertheless, it will be understood that various modifications may be made without departing from the spirit and scope of the invention. Accordingly, other embodiments are within the scope of the following claims.

What is claimed is:

1. A method is provided for controlling cylinder charge in a direct-injection, spark-ignition engine, such engine having an intake manifold and an electronically controlled throttle (ETC) valve controlling air flow from the atmosphere to the intake manifold of said engine, such method comprising:

(A) measuring an intake manifold pressure value, $P_i$;
(B) measuring a flow value, $W_{thr,m}$, indicative of flow through the ETC valve;
(C) determining a desired intake manifold pressure value, $P_{i,d}$;
(D) determining a desired flow, $W_{thr,d}$, through the ETC valve;
(E) determining a desired ETC valve position, $u_{thr,d}$; and,
(F) adjusting said ETC valve position, $u_{thr}$, in accordance with:
  (i) said desired ETC valve position, $U_{thr,d}$;
  (ii) a difference between the measured intake manifold pressure value, $P_i$, and the determined desired intake manifold pressure value, $P_{i,d}$; and
  (iii) a difference between the measured flow value, $W_{thr,m}$, through the ETC valve and the determined desired flow, $W_{thr,d}$.

2. A method for controlling cylinder charge in a direct-injection, spark-ignition engine, such engine including an intake manifold and an electronically controlled throttle (ETC) valve for controlling air flow from the atmosphere to the intake manifold of said engine, such method comprising:

parameterizing air flow through the ETC valve as:

$$W_{thr} = \beta_{thr}{}^0 + \beta_{thr}{}^1 \overline{W}_{thr}$$

where: $\beta_{thr}{}^0$ and $\beta_{thr}{}^1$ are estimator parameters; $\overline{W}_{thr}$ is a nominal predicted flow through the ETC valve, such predicted flow being a function of measured ETC valve position and measured intake manifold pressure;

determining differences between the measured flow through the ETC valve and the predicted flow through the ETC valve;

modifying the estimator parameters in accordance with the determined differences; and providing a desired air flow through the ETC valve by adjusting the ETC valve position, $U_{thr}$, in accordance with the parameterized air flow, such parameterized air flow being a function of the estimator parameters.

3. The method recited in claim 2 wherein the nominal predicted flow is determined from the standard orifice flow equation.

4. The method recited in claim 2 wherein the estimator parameters are modified in accordance with:

$$\hat{\beta}_{thr}^0(t + T_a) = \hat{\beta}_{thr}^0(t) + \gamma_{thr}^0 \varepsilon_{thr} \frac{1}{1 + \overline{W}_{thr}^2}$$

$$\hat{\beta}_{thr}^1(t + T_a) = \hat{\beta}_{thr}^1(t) + \gamma_{thr}^1 \varepsilon_{thr} \frac{\overline{W}_{thr}}{1 + \overline{W}_{thr}^2}$$

where:

$$\varepsilon_{thr} = W_{thr,m} - \hat{W}_{thr}; \quad \hat{W}_{thr} = \hat{\beta}_{thr}{}^0 + \hat{\beta}_{thr}{}^1 \hat{W}_{thr} \text{ and}$$

$\gamma_{thr}{}^0$, $\gamma_{thr}{}^1$, are adaptation gains, $t+T_a$ is a time such adaptation parameters are updated, and $W_{thr,m}$ is measured flow through the ETC valve.

5. The method recited in claim 4 wherein the nominal predicted flow is determined from the standard orifice flow equation.

6. The method recited in claim 2 wherein the prediction is disabled when the intake manifold pressure is relatively high and the ETC valve is experiencing a relatively large transient condition.

7. The method recited in claim 4 wherein a dead zone is applied to $\varepsilon_{thr}$ before it is used.

8. The method recited in claim 4 wherein the adaptation gains are reduced at high intake manifold pressures.

9. A method for controlling air charge in a direct-injection, spark-ignition engine, such engine having an exhaust gas recirculation (EGR) valve connecting the exhaust manifold and intake manifold of the engine and an electronically controlled throttle (ETC) valve controlling air flow from the atmosphere to the intake manifold of said engine, such method comprising:

(A) providing an estimator for estimating flow through the EGR valve;

(B) during a calibration mode:
  (i) applying a step function to the estimator, such estimator having a dynamic response characteristic to the applied step function, such dynamic response characteristic being a function of a parameter in such estimator;
  (ii) comparing the dynamic response characteristic of the estimator to the step function to the dynamic response characteristic provided in accordance with the orifice equation applied to the intake throttle and the EGR valve; and
  (iii) adjusting the parameter of the estimator to a value where the dynamic response characteristic provided by the estimator to the dynamic response characteristic provided by the estimator are substantially match to a predetermined response; and (C) during a subsequent normal operating mode:
  (i) removing the step function; and
  (ii) using the estimator value to estimate flow through the EGR valve.

10. A method for controlling air charge in a direct-injection, spark-ignition engine, such engine having an exhaust gas recirculation (EGR) valve connecting the exhaust manifold and intake manifold of the engine and an electronically controlled throttle (ETC) valve controlling air flow from the atmosphere to the intake manifold of said engine, such method comprising:

(A) measuring an intake manifold pressure value which is indicative of measured intake manifold pressure;

(B) estimating flow into the cylinder as a function of the measured intake manifold pressure;

(C) modifying the estimated flow into the cylinder with a time varying multiplier; and (D) determining, when the EGR valve is opened, the time varying multiplier as a function of the difference between measured flow through the ETC and the modified estimated flow into the cylinder with a previously determined multiplier.

\* \* \* \* \*